United States Patent
Yun et al.

(10) Patent No.: US 10,554,457 B2
(45) Date of Patent: Feb. 4, 2020

(54) RECEIVER AND RECEPTION METHOD BASED ON PULSE

(71) Applicant: Samsung Electronics Co., Ltd., Suwon-si (KR)

(72) Inventors: Seok Ju Yun, Hwaseong-si (KR); Sang Joon Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/058,263

(22) Filed: Aug. 8, 2018

(65) Prior Publication Data
US 2019/0052492 A1 Feb. 14, 2019

(30) Foreign Application Priority Data

Aug. 11, 2017 (KR) .................... 10-2017-1012596
Dec. 4, 2017 (KR) .................... 10-2017-0164949

(51) Int. Cl.
*H04B 3/46* (2015.01)
*H04L 27/06* (2006.01)
*H04B 1/16* (2006.01)

(52) U.S. Cl.
CPC ............ *H04L 27/06* (2013.01); *H04B 1/16* (2013.01)

(58) Field of Classification Search
CPC .......... H04L 27/06; H04B 1/16; H04B 17/20; H04B 17/00
USPC ........................................... 375/224
See application file for complete search history.

(56) References Cited

U.S. PATENT DOCUMENTS

| 7,215,936 | B2 | 5/2007 | Sadowski |
| 8,054,913 | B2 | 11/2011 | Terada |
| 8,285,243 | B2 | 10/2012 | Kang et al. |
| 9,229,502 | B2 | 1/2016 | Vlaiko |
| 9,413,578 | B2 | 8/2016 | Rajagopal et al. |
| 2009/0156158 | A1* | 6/2009 | Kang ............ H04B 1/24 455/336 |
| 2009/0316912 | A1* | 12/2009 | De Poortere ............ H04R 3/04 381/1 |
| 2013/0058437 | A1* | 3/2013 | Oshima ............ H03M 1/0836 375/316 |

(Continued)

FOREIGN PATENT DOCUMENTS

| EP | 2568607 A2 | 3/2013 |
| JP | 2008-99252 A | 4/2008 |

(Continued)

OTHER PUBLICATIONS

Pletcher, Nathan M., et al., "A 52 µW Wake-Up Receiver With -72 dBm Sensitivity Using an Uncertain-IF Architecture", *IEEE Journal of Solid-State Circuits*, vol. 44, No. 1, Jan. 2009, pp. 269-280.

(Continued)

*Primary Examiner* — Dhaval V Patel
(74) *Attorney, Agent, or Firm* — NSIP Law

(57) ABSTRACT

A receiver includes an antenna configured to receive a radio signal, a pulse generator configured to generate a pulse, an oscillator configured to be driven based on the pulse to generate an oscillation signal based on the radio signal, and a measurer configured to be driven by the pulse to measure an oscillation degree of the oscillation signal, wherein the radio signal is received based on the oscillation degree of the oscillation signal.

25 Claims, 19 Drawing Sheets

(56) References Cited

U.S. PATENT DOCUMENTS

| | | | |
|---|---|---|---|
| 2013/0170588 A1* | 7/2013 | Park | H04B 1/06 |
| | | | 375/340 |
| 2014/0028407 A1* | 1/2014 | Chern | H03B 5/32 |
| | | | 331/117 R |
| 2014/0105344 A1* | 4/2014 | Chakraborty | H03D 11/06 |
| | | | 375/371 |
| 2017/0117862 A1 | 4/2017 | Yun et al. | |
| 2017/0141803 A1 | 5/2017 | Chakraborty et al. | |

FOREIGN PATENT DOCUMENTS

| | | |
|---|---|---|
| KR | 10-0587787 B1 | 6/2006 |
| KR | 10-0918001 B1 | 9/2009 |
| KR | 10-1141044 B1 | 7/2012 |
| WO | WO 03/009482 A1 | 1/2003 |
| WO | WO 2017/091466 A1 | 6/2017 |

OTHER PUBLICATIONS

Drago, Salvatore, et al., "A 2.4GHz 830pJ/bit Duty-Cycled Wake-Up Receiver with -82dBm Sensitivity for Crystal-Less Wireless Sensor Nodes," *Digest of Technical Papers of the 2010 IEEE International Solid-State Circuits Conference (ISSCC 2010)*, Feb. 2010, pp. 224, 225 and continuation page, conference held Feb. 7-11, 2010, in San Francisco, Calif., paper presented on Feb. 9, 2010.

Extended European Search Report dated Dec. 20, 2018 in counterpart European Patent Application No. 18186333.3 (9 pages, in English).

\* cited by examiner

1600

RECEIVER AND RECEPTION METHOD BASED ON PULSE

CROSS-REFERENCE TO RELATED APPLICATIONS

This application claims the benefit under 35 USC 119(a) of Korean Patent Application Nos. 10-2017-0102596 filed on Aug. 11, 2017, and 10-2017-0164919 filed on Dec. 4, 2017, in the Korean Intellectual Property Office, the entire disclosures of which are incorporated herein by reference for all purposes.

BACKGROUND

1. Field

The following description relates to a receiver and a reception method based on a pulse.

2. Description of Related Art

Recently, with development of information and communication technology, Internet of things (IoT) devices that transmit and receive data in real time by attaching sensors to objects are becoming popular. The IoT device may be a subminiature wireless transceiver configured to perform communication at a low power to process information by performing transmission and reception of the information between distributed elements such as objects. To provide the IoT devices in subminiature sizes and implement a low power communication system, wireless communication needs to be performed with a low power, a high receive sensitivity, and no latency.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a receiver includes an antenna configured to receive a radio signal; a pulse generator configured to generate a pulse; an oscillator configured to be driven based on the pulse to generate an oscillation signal based on the radio signal; and a measurer configured to be driven based on the pulse to measure an oscillation degree of the oscillation signal, wherein the radio signal is received based on the oscillation degree of the oscillation signal.

The measurer may be further configured to measure an oscillation time of the oscillation signal as the oscillation degree of the oscillation signal, and the radio signal may be received based on the oscillation time of the oscillation signal.

The measurer may be further configured to generate an output proportional to the oscillation time of the oscillation signal, and the radio signal may be received based on whether the generated output is greater than or equal to a threshold.

The radio signal may be received as a first value in response to the oscillation time being greater than or equal to a threshold time, and received as a second value different from the first value in response to the oscillation time being less than the threshold time.

An amplitude or a frequency of the radio signal received by the antenna may be received based on the oscillation time of the oscillation signal.

The pulse generator may be further configured to provide a first current to the oscillator in a first period of time from a start point in time of the pulse to an intermediate point in time between the start point in time of the pulse and an end point in time of the pulse, and provide a second current smaller than the first current to the oscillator in a second period of time from the intermediate point in time to the end point in time of the pulse.

The oscillator may include a tank circuit including a plurality of capacitors, and the plurality of capacitors may have unequal values in a first period of time from a start point in time of the pulse to an intermediate point in time between the start point in time of the pulse and an end point in time of the pulse, and equal values in a second period of time from the intermediate point in time to the end point in time of the pulse.

The receiver may further include an inductor having a Q-value greater than or equal to a threshold applied to the oscillator.

The measurer may be further configured to generate an output proportional to an oscillation time of the oscillator, and the pulse generator may be further configured to adjust a width of the pulse based on the output generated by the measurer.

The measurer may be further configured to generate an output proportional to an oscillation frequency of the oscillation signal and a width of the pulse based on an oscillation time of the oscillation signal.

The pulse generator may be further configured to generate the pulse at an interval of a period less than or equal to ½ times an on-off keying (OOK) modulation period of the radio signal.

The measurer may be further configured to detect an envelope of the oscillation signal as the oscillation degree of the oscillation signal, and the radio signal may be received based on the envelope of the oscillation signal.

The measurer may be further configured to measure an amplitude of the detected envelope of the oscillation signal, and the radio signal is received based on whether the amplitude of the detected envelope is greater than or equal to a threshold.

The oscillator and the measurer may be further configured to operate during an interval in which the oscillator and the measurer receive the pulse from the pulse generator.

A power consumption of the receiver may be determined by a data rate of the radio signal and a width of the pulse.

The receiver may further include a radio frequency (RF) amplifier configured to be driven based on the pulse to amplify the oscillation signal and output the amplified oscillation signal to the measurer.

In another general aspect, a reception method includes generating a pulse at an interval of a predetermined period; generating, during the pulse, an oscillation signal based on a radio signal received by an antenna, the generating being enabled based on the pulse; and measuring, during the pulse, an oscillation degree of the oscillation signal, the measuring being enabled based on the pulse, wherein the radio signal is received based on the oscillation degree of the oscillation signal.

The measuring may include generating an output proportional to an oscillation time of the oscillation signal as the oscillation degree of the oscillation signal, and the radio signal may be received based on whether the generated output is greater than or equal to a threshold.

The measuring may include detecting an envelope of the oscillation signal as the oscillation degree of the oscillation signal, and the radio signal may be received based on whether an amplitude of the detected envelope is greater than or equal to a threshold.

In another general aspect, a non-transitory computer-readable medium stores instructions that, when executed by a processor, control the processor to perform the reception method described above.

In another general aspect, a receiver includes an antenna configured to receive a radio signal; a pulse generator configured to generate a pulse at an interval of a predetermined period; an oscillator configured to be powered on by the pulse to generate an oscillation signal based on the radio signal only while the pulse is present; and a measurer configured to be powered on by the pulse to measure a parameter of the oscillation signal depending on the radio signal only while the pulse is present, wherein the radio signal is received based on the parameter of the oscillation signal.

The measurer may be further configured to measure an oscillation time as the parameter of the oscillation signal or detect an envelope of the oscillation signal as the parameter of the oscillation signal, and the radio signal may be received based on the oscillation time of the oscillation signal or the envelope of the oscillation signal.

The receiver may further include a fast startup circuit configured to reduce a startup time of the oscillator during a first portion of the pulse by either one or both of increasing a current supplied to the oscillator during the first portion of the pulse, and adjusting a value of a capacitor applied to the oscillator during the first portion of the pulse.

The oscillator may be a first oscillator configured to generate a first clock signal having a first frequency and requiring a first power level to operate, the receiver may further include a second oscillator configured to generate a second clock signal having a second frequency lower than the first frequency and requiring a second power level lower than the first power level to operate, and a selector configured to select one of the first clock signal and the second clock signal based on the radio signal, and the pulse generator may be further configured to generate the pulse at the interval of the predetermined period based on the selected one of the first clock signal and the second clock signal.

The selector may be further configured to select the first clock signal in response to the first frequency being at least twice a frequency of the radio signal and the second frequency being less than twice the frequency of the radio signal, and select the second clock signal in response to both the first frequency and the second frequency being at least twice the frequency of the radio signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
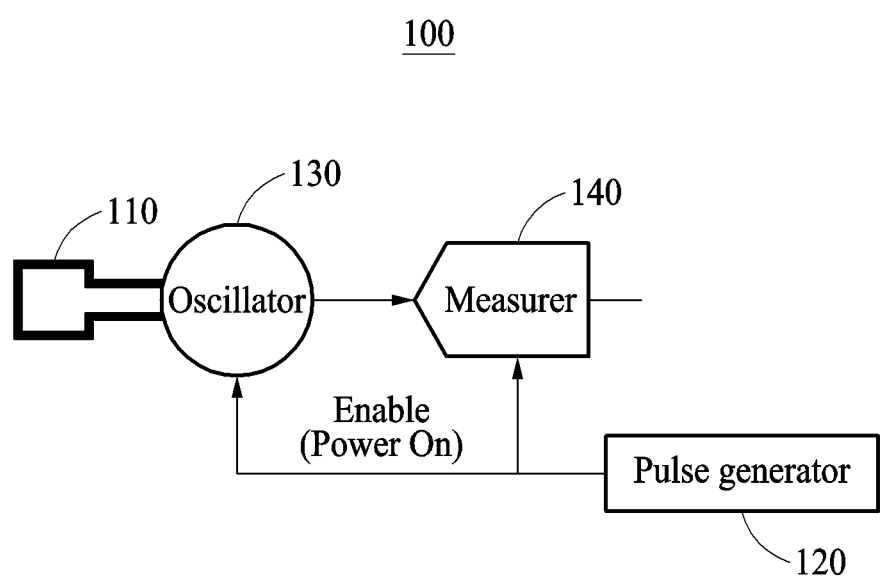
FIG. 1 illustrates an example of a receiver.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 illustrates an example of a receiver.

Referring to FIG. 1, a receiver 100 includes an antenna 110, a pulse generator 120, an oscillator 130, and a measurer 140.

The receiver 100 is a device for receiving a radio signal. The receiver 100 may be implemented as, for example, a subminiature wireless transceiver such as, for example, a low power communication device, an Internet of things (IoT) device, an implantable communication device, or a medical implant communications system (MICS).

A radio signal is received by the antenna 110. The radio signal is a signal transmitted and received through wireless communication, for example, a radio frequency (RF) signal. In one example, the RF signal is a signal modulated by amplitude shift keying (ASK), for example, on-off keying (OOK). In another example, the RF signal is modulated by frequency shift keying (FSK). For brevity, the following description is provided based on an example in which a radio signal is modulated by OOK.

The pulse generator 120 generates a pulse. The pulse generator 120 generates the pulse based on a predetermined period. For example, the predetermined period is less than or equal to ½ times an OOK modulation period of a radio signal. The pulse generated in the pulse generator 120 is provided to the oscillator 130 and the measurer 140.

The oscillator 130 may be an LC-VCO (inductor-capacitor voltage-controlled oscillator) driven by the pulse. For example, the oscillator 130 does not operate during an interval in which a pulse is not provided to the oscillator 130, and thus an oscillation signal is not generated in the oscillator 130. Conversely, the oscillator 130 operates during an interval in which the pulse is provided to the oscillator 130, and thus an oscillation signal is generated based on a radio signal. As such, the oscillator 130 operates in a relatively short interval in which the pulse is provided from the pulse generator 120, whereby a power consumption of the receiver 100 is effectively reduced.

When the pulse is provided to the oscillator 130, the oscillator 130 generates an oscillation signal based on the radio signal received by the antenna 110. For example, a signal generated in the oscillator 130 based on a radio signal "1" received by the antenna 110 during the interval in which the pulse is provided is different from a signal generated in the oscillator 130 based on a radio signal "0" received by the antenna 110 during the interval in which the pulse is provided. The oscillator 130 determines whether an RF carrier is present and generates the oscillation signal based on a determination result. The oscillation signal will also be described in detail with reference to FIG. 2.

The measurer 140 measures an oscillation degree of the oscillation signal. In this example, the measurer 140 is also driven by the pulse. The measurer 140 is driven to measure the oscillation degree of the oscillation signal during the interval in which the pulse is provided from the pulse generator 120. For example, the measurer 140 measures an oscillation time of the oscillation signal or an envelope of the oscillation signal as the oscillation degree of the oscillation signal.

A radio signal is received based on the oscillation degree of the oscillation signal measured in the measurer 140. In one example, the radio signal is received based on an oscillation time of the oscillation signal measured in the measurer 140. In another example, the radio signal is received based on an envelope of the oscillation signal measured in the measurer 140.

For brevity, the following description will be provided based on an example in which a radio signal is received based on an oscillation time of an oscillation signal. An example in which a radio signal is received based on an envelope of an oscillation signal will be described with reference to FIG. 16.

Figure 2:
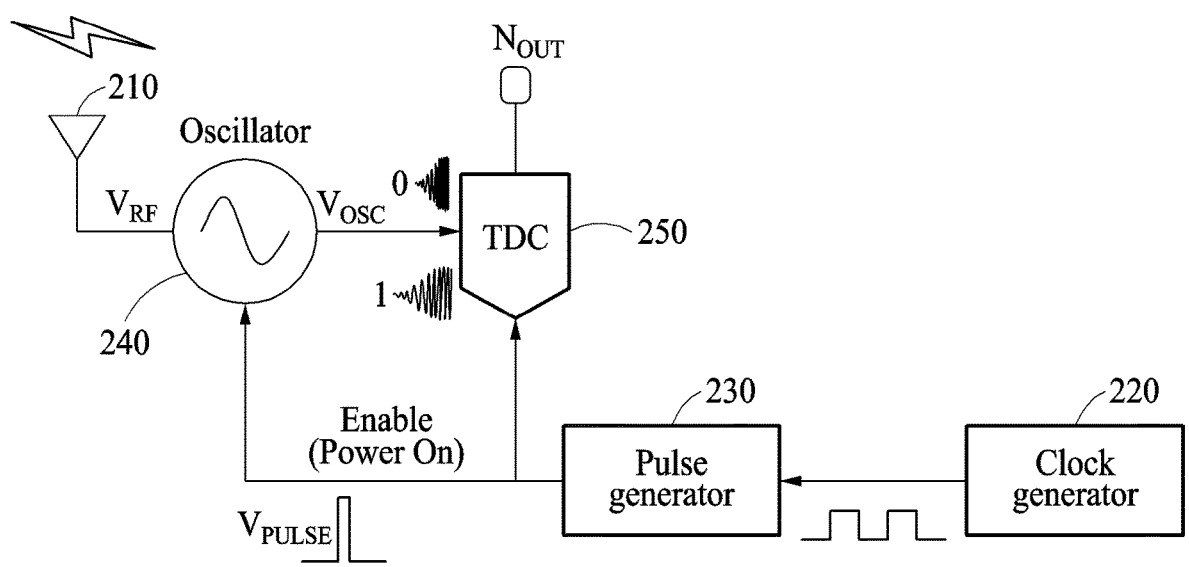
FIG. 2 illustrates an example of a receiver including a time-to-digital converter (TDC).

FIG. 2 illustrates an example of a receiver including a time-to-digital converter (TDC).

Referring to FIG. 2, a receiver 200 includes an antenna 210, a clock generator 220, a pulse generator 230, an oscillator 240, and a TDC 250. For example, the measurer 140 of FIG. 1 may correspond to the TDC 250. In this example, the receiver 200 receives a radio signal $V_{RF}$ based on an oscillation time of an oscillation signal $V_{OSC}$ measured using the TDC 250.

The radio signal $V_{RF}$ is received by the antenna 210. For example, the radio signal $V_{RF}$ is a signal modulated by OOK, and may correspond to "1" or "0".

The clock generator 220 generates a clock signal and provides the clock signal to the pulse generator 230. The pulse generator 230 generates a pulse $V_{PULSE}$ at an interval of a predetermined period based on the received clock signal. The oscillator 240 and the TDC 250 are enabled, for example, powered on, by the pulse $V_{PULSE}$.

The oscillator 240 is, for example, an inductor-capacitor (LC) oscillator driven by the pulse $V_{PULSE}$ to generate an oscillation signal $V_{OSC}$ based on the radio signal $V_{RF}$. The oscillator 240 generates the oscillation signal $V_{OSC}$ oscillating in a period of time varying based on the radio signal $V_{RF}$. For example, when the radio signal $V_{RF}$ received by the antenna 210 is "1", the oscillator 240 generates the oscillation signal $V_{OSC}$ oscillating in a greater period of time than in a case in which the radio signal $V_{RF}$ received by the antenna 210 is "0". When the radio signal $V_{RF}$ received by the antenna 210 is "0", the oscillator 240 generates the oscillation signal $V_{OSC}$ oscillating in a lesser period of time than in a case in which the radio signal $V_{RF}$ received by the antenna 210 is "1".

The TDC 250 measures an oscillation time of the oscillation signal $V_{OSC}$ and outputs an output count $N_{OUT}$ corresponding to the measured oscillation time. The TDC 250 generates the output count $N_{OUT}$ proportionally to the oscillation time of the oscillation signal $V_{OSC}$. For example, the TDC 250 generates the output count $N_{OUT}$ based on an oscillating start time of the oscillation signal $V_{OSC}$. When an amplitude of the oscillation signal $V_{OSC}$ is greater than or equal to a threshold amplitude, the TDC 250 recognizes that the oscillation signal $V_{OSC}$ oscillates, and thus generates the output count $N_{OUT}$.

The receiver 200 receives the radio signal $V_{RF}$ based on the output count $N_{OUT}$ of the TDC 250. When the output count $N_{OUT}$ of the TDC 250 is greater than or equal to a threshold count $N_{REF}$, the receiver 200 receives the radio signal $V_{RF}$ corresponding to "1". When the output count $N_{OUT}$ of the TDC 250 is less than the threshold count $N_{REF}$, the receiver 200 receives the radio signal $V_{RF}$ corresponding to "0".

FIGS. 3 through 6 illustrate an example of a procedure of receiving a radio signal in the receiver of FIG. 2.

Figure 3:
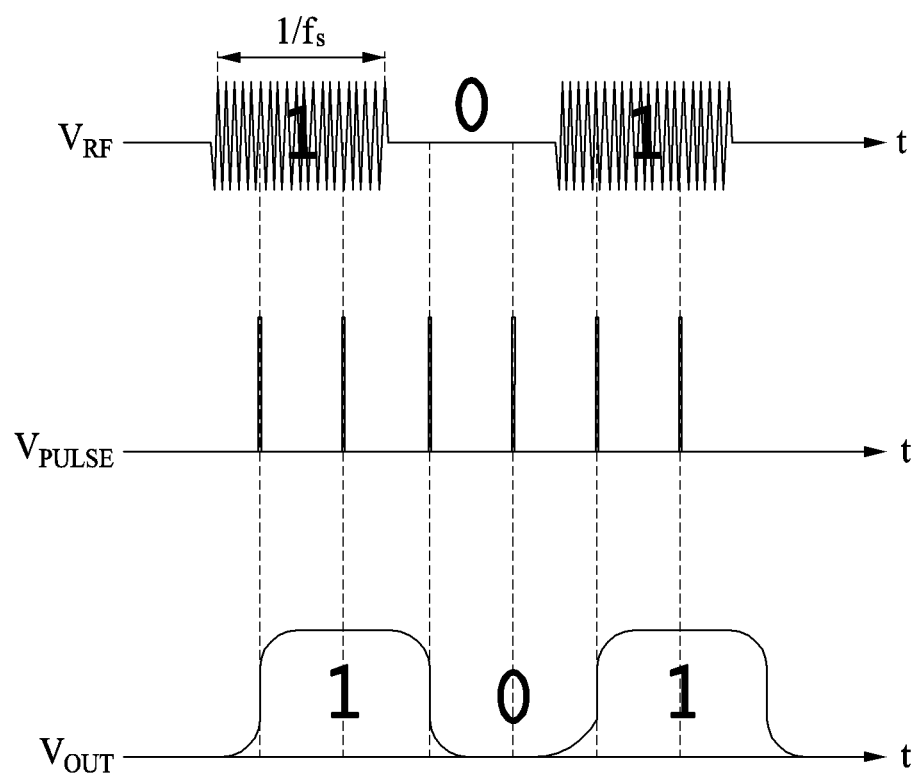
FIGS. 3 through 6 illustrate an example of a procedure of receiving a radio signal in the receiver of FIG. 2.

FIG. 3 illustrates a radio signal $V_{RF}$, a pulse $V_{PULSE}$, and a received signal $V_{OUT}$.

The radio signal $V_{RF}$ is a signal modulated by OOK, and may correspond to "1" or "0". An OOK modulation period of the radio signal $V_{RF}$ is $1/f_S$, where $f_S$ is the data rate of the radio signal $V_{RF}$. The pulse $V_{PULSE}$ is generated at a period less than or equal to ½ times $1/f_S$.

The received signal $V_{OUT}$ corresponds to a value to which the radio signal $V_{RF}$ corresponds during an interval in which the pulse $V_{PULSE}$ is provided. In the example of FIG. 3, the radio signal $V_{RF}$ corresponds to "1" at first, second, fifth, and sixth points in time at which a pulse is provided, and thus the received signal $V_{OUT}$ corresponds to "1" at the first, second, fifth, and sixth points in time. Also, the radio signal $V_{RF}$ corresponds to "0" at third and fourth points in time in which a pulse is provided, and thus the received signal $V_{OUT}$ corresponds to "0" at the third and fourth points in time.

As such, a receiver operates based on the pulse $V_{PULSE}$ and measures an oscillation time of an oscillation signal using a TDC whereby the radio signal $V_{RF}$ is accurately received during a relatively short pulse period.

Figure 4:
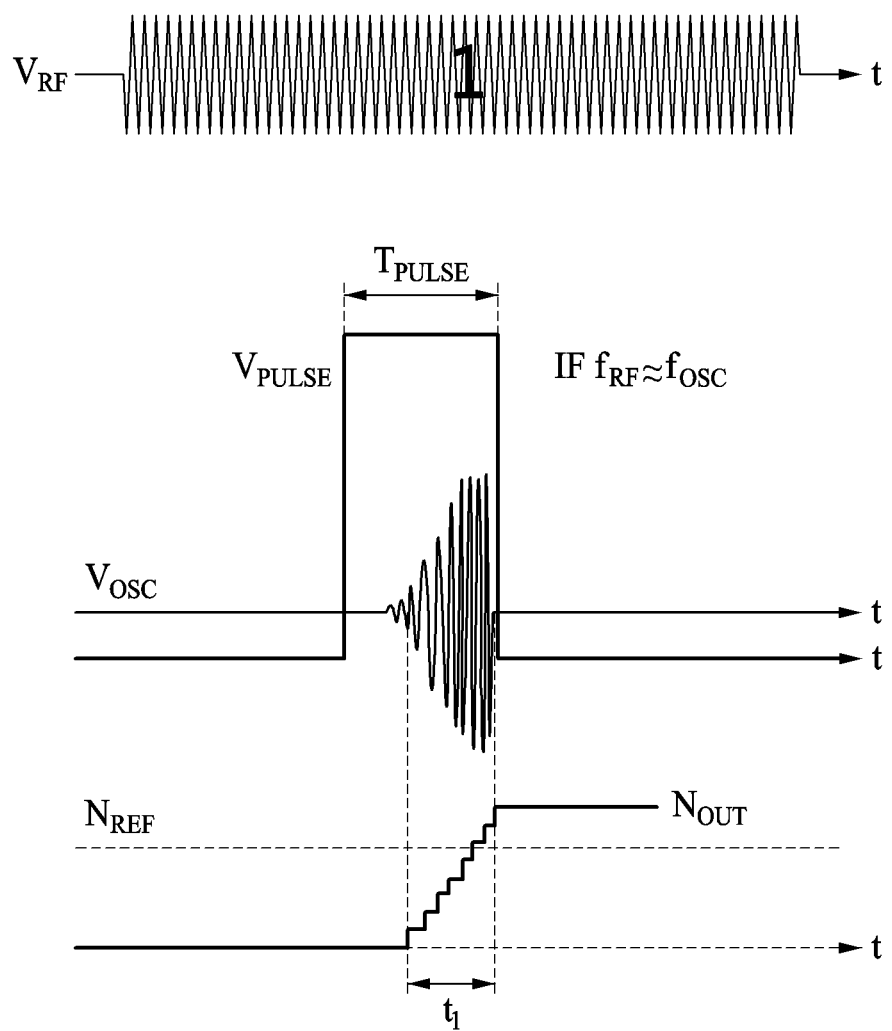

Referring to FIG. 4, the radio signal $V_{RF}$ corresponds to "1". In this example, the pulse $V_{PULSE}$ is high during $T_{PULSE}$.

When the radio signal $V_{RF}$ is "1" during an interval in which the pulse $V_{PULSE}$ is provided, the oscillation signal $V_{OSC}$ starts oscillating quickly in an oscillator. For example, the oscillation signal $V_{OSC}$ starts oscillating starting from a point in time relatively close to a rising edge of the pulse $V_{PULSE}$. When the oscillation signal $V_{OSC}$ starts oscillating quickly, an interval in which an amplitude of the oscillation signal $V_{OSC}$ is greater than or equal to a predetermined amplitude increases.

A TDC measures a length of the interval in which the amplitude of the oscillation signal $V_{OSC}$ is greater than or equal to the predetermined amplitude. For example, an output count $N_{OUT}$ of the TDC is proportional to an oscillation time $t_1$ of the oscillation signal $V_{OSC}$. When the oscillation time $t_1$ of the oscillation signal $V_{OSC}$ is greater than or equal to a threshold time, a receiver receives the radio signal $V_{RF}$ corresponding to "1". The threshold time corresponds to a threshold count $N_{REF}$. When the output count $N_{OUT}$ of the TDC is greater than or equal to a threshold count $N_{REF}$, it is determined that the oscillation time $t_1$ of the oscillation signal $V_{OSC}$ is greater than or equal to the threshold time.

In this example, when a difference between a frequency $f_{RF}$ of the radio signal $V_{RF}$ and the oscillation frequency $f_{OSC}$ of the oscillation signal $V_{OSC}$ decreases, an influence of the radio signal $V_{RF}$ transferred to the oscillation signal $V_{OSC}$ increases and the oscillation signal $V_{OSC}$ starts oscillating more quickly in response to the radio signal $V_{RF}$ being "1". That is, the point in time at which the oscillation signal $V_{OSC}$ starts oscillating moves closer to the rising edge of the pulse $V_{PULSE}$. Conversely, when the difference between the frequency $f_{RF}$ of the radio signal $V_{RF}$ and the oscillation frequency $f_{OSC}$ of the oscillation signal $V_{OSC}$ increases, the influence of the radio signal $V_{RF}$ transferred to the oscillation signal $V_{OSC}$ decreases and the oscillation signal $V_{OSC}$ starts oscillating less quickly in response to the radio signal $V_{RF}$ being "1". That is, the point in time at which the oscillation signal $V_{OSC}$ starts oscillating moves farther away from the rising edge of the pulse $V_{PULSE}$. Thus, by decreasing the difference between the frequency $f_{RF}$ of the radio signal $V_{RF}$ and the oscillation frequency $f_{OSC}$ of the oscillation signal $V_{OSC}$, a difference between an oscillation time of the oscillation signal $V_{OSC}$ when the radio signal $V_{RF}$ is present and an oscillation time of the oscillation signal $V_{OSC}$ when the radio signal $V_{RF}$ is absent increases. This enables whether the radio signal $V_{RF}$ is present or absent to be sensed based on the oscillation time of the oscillation signal $V_{OSC}$ with increased accuracy.

Figure 5:
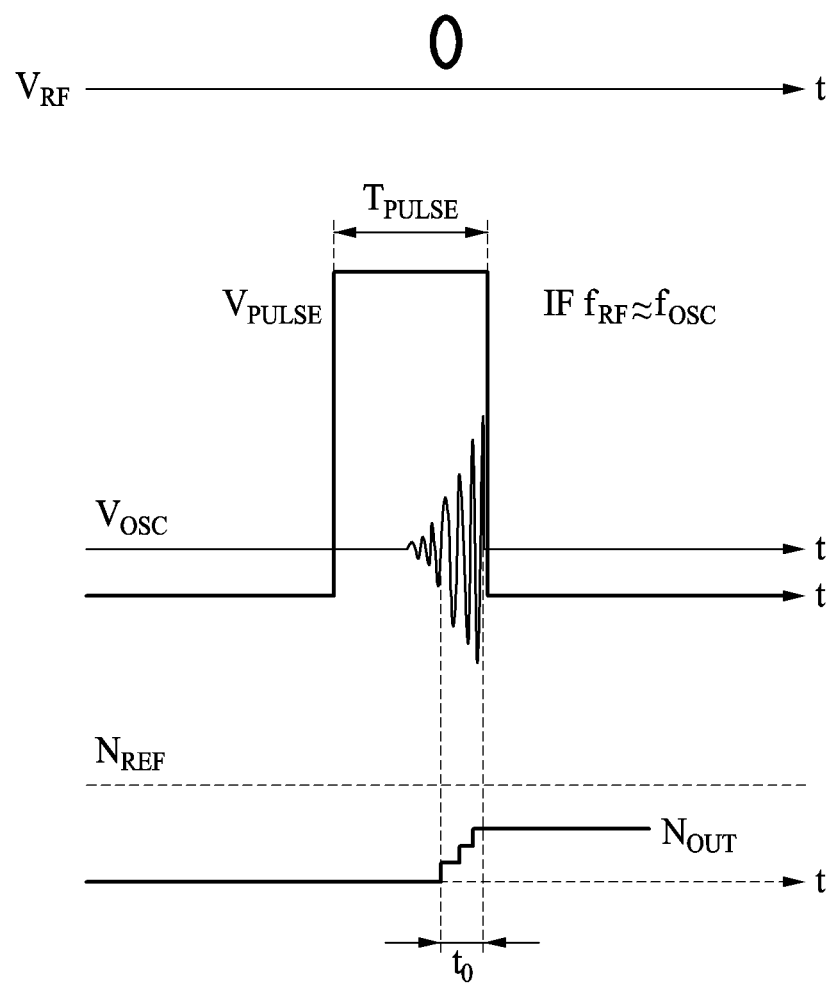

Referring to FIG. 5, the radio signal $V_{RF}$ corresponds to "0".

When the radio signal $V_{RF}$ corresponds to "0" at a point in time at which the pulse $V_{PULSE}$ is provided, the oscillation signal $V_{OSC}$ starts oscillating slowly in the oscillator. For example, the oscillation signal $V_{OSC}$ starts oscillating starting from a point in time relatively far from the rising edge of the pulse $V_{PULSE}$. When the oscillation signal $V_{OSC}$ starts oscillating slowly, the interval in which the amplitude of the oscillation signal $V_{OSC}$ is greater than or equal to the predetermined amplitude decreases.

The TDC continuously increases the output count $N_{OUT}$ starting from zero during the interval in which the amplitude of the oscillation signal $V_{OSC}$ is greater than or equal to the predetermined amplitude. Thus, the longer the interval in which the amplitude of the oscillation signal $V_{OSC}$ is greater than or equal to the predetermined amplitude, the higher the output count $N_{OUT}$. Thus, an oscillation time $t_0$ of the oscillation signal $V_{OSC}$ is obtained based on the output count $N_{OUT}$ of the TDC. When the oscillation time $t_0$ of the oscillation signal $V_{OSC}$ is less than a threshold time, the receiver receives the radio signal $V_{RF}$ corresponding to "0". The threshold time corresponds to the threshold count $N_{REF}$. Thus, when the output count $N_{OUT}$ of the TDC is less than the threshold count $N_{REF}$, it is determined that the oscillation time $t_0$ of the oscillation signal $V_{OSC}$ is less than the threshold time. The oscillation time $t_0$ of the oscillation signal $V_{OSC}$ of FIG. 5 is less than the oscillation time $t_1$ of the oscillation signal $V_{OSC}$ in FIG. 4.

Figure 6:
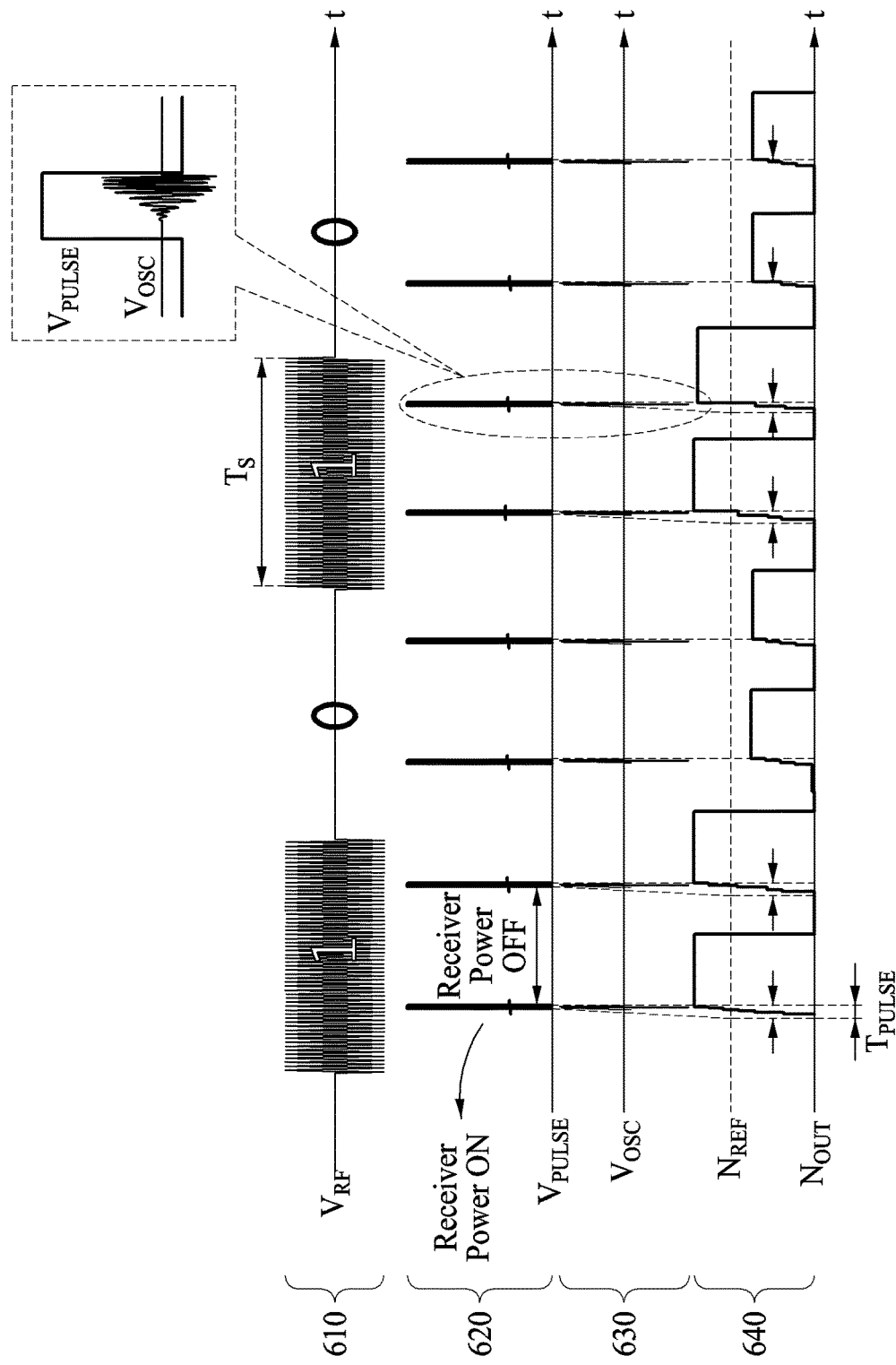

FIG. 6 illustrates an example of a procedure of receiving a radio signal using a TDC.

In operation 610, the radio signal $V_{RF}$ is a signal modulated by OOK and corresponds to "1", "0", "1", and "0". An OOK modulation period of the radio signal $V_{RF}$ is $T_S$, which corresponds to $1/f_S$ shown in FIG. 3.

In operation 620, the pulse $V_{PULSE}$ is generated in a pulse generator at an interval of a predetermined period. For example, the pulse $V_{PULSE}$ is generated at an interval of a predetermined period less than or equal to ½ times the OOK modulation period $T_S$ of the radio signal $V_{RF}$. A receiver is powered on during an interval in which the pulse $V_{PULSE}$ is generated. Also, the receiver is powered off during an interval in which the pulse $V_{PULSE}$ is not generated. The interval in which the pulse $V_{PULSE}$ is generated has a length of $T_{PULSE}$.

In operation 630, an oscillator driven by the pulse $V_{PULSE}$ generates the oscillation signal $V_{OSC}$ based on the radio signal $V_{RF}$. For example, an oscillation time of the oscillation signal $V_{OSC}$ that is generated during an interval in which the radio signal $V_{RF}$ corresponds to "1" is greater than or equal to an oscillation time of the oscillation signal $V_{OSC}$ that is generated during an interval in which the radio signal $V_{RF}$ corresponds to "0".

In operation 640, a TDC driven by the pulse $V_{PULSE}$ generates the output count $N_{OUT}$ proportionally to an oscillation time of the oscillation signal $V_{OSC}$. For example, an oscillation time of the oscillation signal $V_{OSC}$ generated during the interval in which the radio signal $V_{RF}$ is "1" is greater than or equal to a threshold time. In this example, the output count $N_{OUT}$ of the TDC is greater than or equal to the threshold count $N_{REF}$, and thus the receiver receives the radio signal $V_{RF}$ corresponding to "1". Also, an oscillation time of the oscillation signal $V_{OSC}$ generated during the interval in which the radio signal $V_{RF}$ is "0" is less than the threshold time. Thus, the output count $N_{OUT}$ of the TDC is less than the threshold count $N_{REF}$, and thus the receiver receives the radio signal $V_{RF}$ corresponding to "0".

The TDC continues to output the output count $N_{OUT}$ until a reset signal (not illustrated in FIG. 6) is input to the TDC to reset the output count $N_{OUT}$ to 0. The reset signal is input to the TDC before a pulse subsequent to the pulse $V_{PULSE}$ is generated to reset the output count $N_{OUT}$ to 0.

The threshold count $N_{REF}$ may be predetermined or may be dynamically changed based on output counts $N_{OUT}$ of the TDC produced by a predetermined radio signal. In one example, if a predetermined radio signal "1, 0, 1, 0" is input to the oscillator and causes the TDC to produce output counts $N_{OUT}$ "10, 5, 10, 5", the threshold count $N_{REF}$ is dynamically set to 7.5. That is, the threshold count $N_{REF}$ is dynamically set to a value halfway between the output count $N_{OUT}$ 10 produced by the radio signal "1" and the output count $N_{OUT}$ 5 produced by the radio signal "0.". However, this is just one example, and the predetermined radio signal "1, 0, 1, 0" may produce other output counts $N_{OUT}$, or other predetermined radio signals may be used, or the threshold count $N_{REF}$ may be dynamically set using other schemes.

Figure 7:
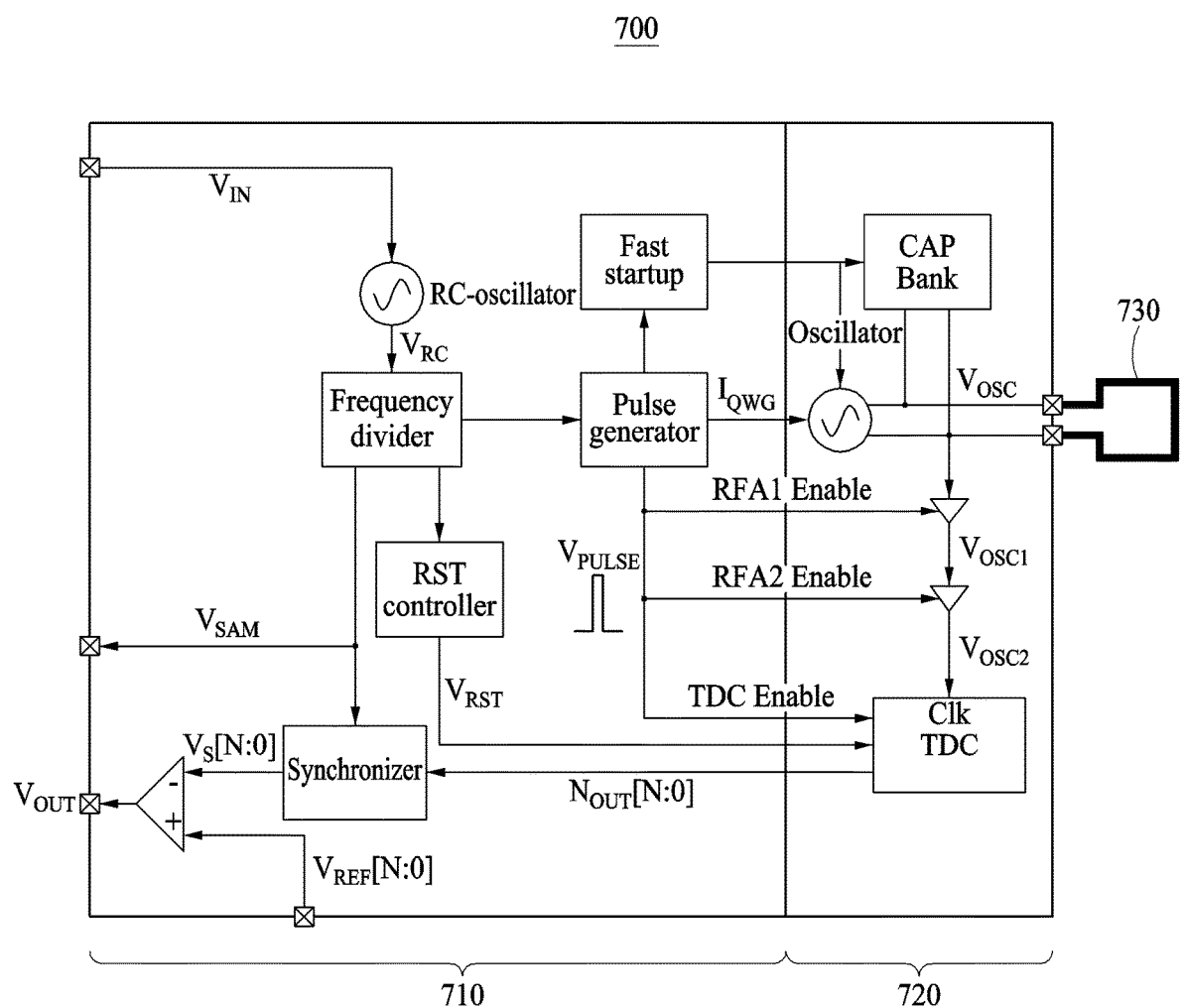
FIG. 7 illustrates another example of a receiver including a TDC.

FIG. 7 illustrates another example of a receiver including a TDC.

Referring to FIG. 7, a receiver 700 includes a controller 710, a receiving main block, for example, an RX main block 720, and an antenna 730. The receiver 700 is, for example, an RF transceiver.

The controller 710 generates a pulse $V_{PULSE}$ and provides the pulse $V_{PULSE}$ to the RX main block 720. For example, a resistor-capacitor (RC)-oscillator is a clock generator configured to generate a clock signal in response to an input voltage $V_{IN}$ and provides a generated clock signal $V_{RC}$ to a pulse generator. The pulse generator generates a pulse $V_{PULSE}$ based on the clock signal $V_{RC}$ and provides the pulse $V_{PULSE}$ to an oscillator, an RF amplifier, for example, an operational amplifier, and a TDC in the RX main block 720. In this example, the pulse $V_{PULSE}$ is generated at an interval of a period determined by a frequency divider, and a width of the pulse $V_{PULSE}$ is determined by the pulse generator.

A fast startup circuit is a circuit that enables an oscillation signal $V_{OSC}$ to be rapidly generated in an oscillator in order to reduce the width of the pulse $V_{PULSE}$, will be described with reference to FIGS. 12 through 14. The antenna 730 and a plurality of capacitors of a CAP bank form a tank circuit of the oscillator. The antenna 730 serves as an inductor of the tank circuit.

The oscillator in the RX main block 720 is driven by the pulse $V_{PULSE}$ to generate the oscillation signal $V_{OSC}$ based on a radio signal received by the antenna 730. The oscillation signal $V_{OSC}$ is amplified by the RF amplifier. The RF amplifier is driven by the pulse $V_{PULSE}$. Although FIG. 7 illustrates two RF amplifiers as one example, the RX main block 720 may include one RF amplifier or three or more RF amplifiers without restriction.

The TDC outputs an output count $N_{OUT}$ that is proportional to an oscillation time of an amplified oscillation signal $V_{OSC2}$ driven by the pulse $V_{PULSE}$. The TDC receives a reset signal $V_{RST}$ from a reset controller, for example, an RST controller, and resets the output count $N_{OUT}$ before a pulse subsequent to the pulse $V_{PULSE}$ is provided.

A synchronizer performs phase synchronization on a clock signal $V_{SAM}$ and the output count $N_{OUT}$ of the TDC. Also, a synchronized signal $V_S$ is compared to a threshold voltage $V_{REF}$ in a comparator so that a received signal $V_{OUT}$ is output. The threshold voltage $V_{REF}$ corresponds to the aforementioned threshold count $N_{REF}$.

Figure 8:
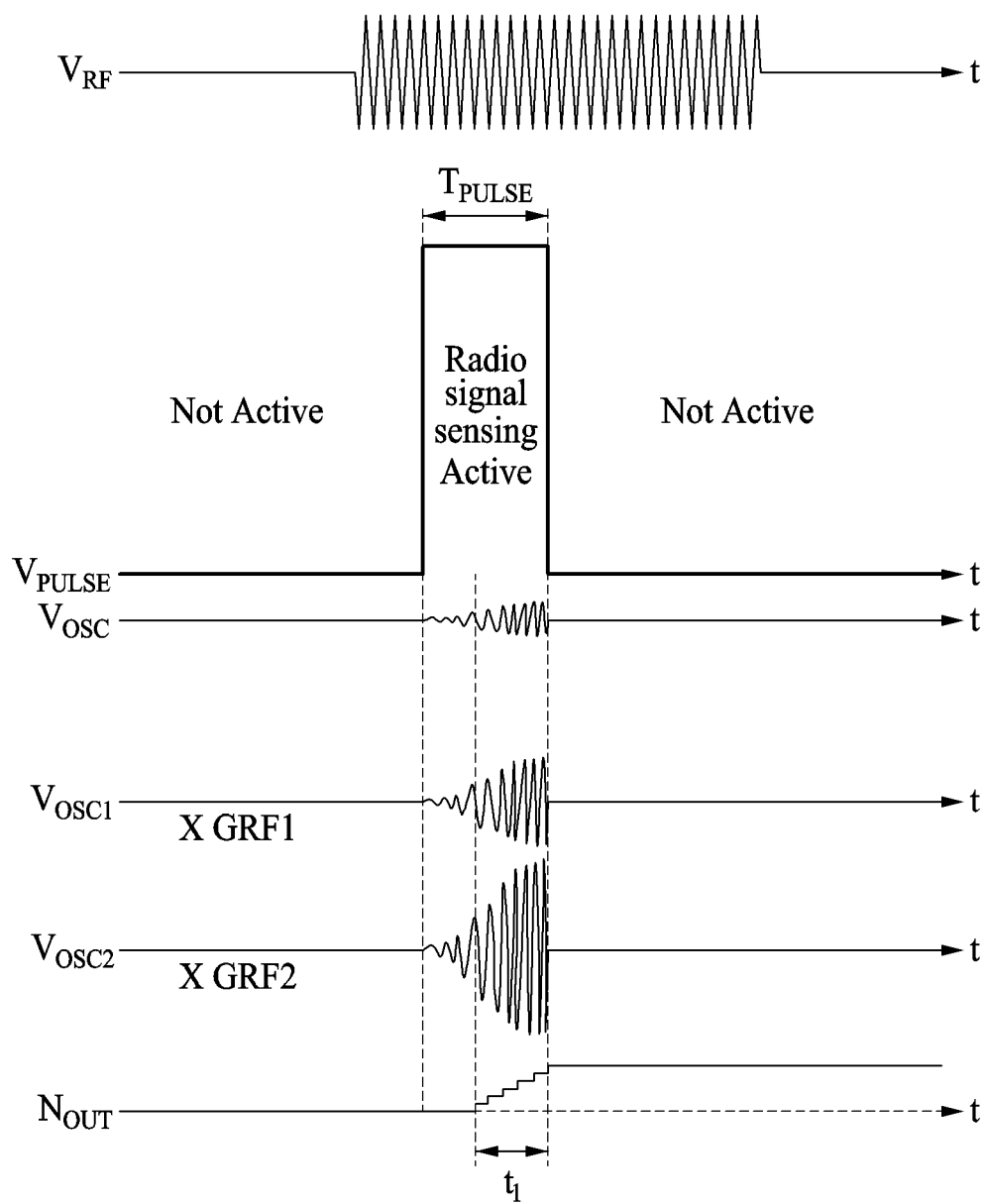
FIG. 8 illustrates an example of a procedure of receiving a radio signal in the receiver of FIG. 7.

FIG. 8 illustrates an example of a procedure of receiving a radio signal in the receiver of FIG. 7.

FIG. 8 illustrates a radio signal $V_{RF}$, a pulse $V_{PULSE}$, an oscillation signal $V_{OSC}$, amplified oscillation signals $V_{OSC1}$ and $V_{OSC2}$, and an output count $N_{OUT}$ of a TDC. In the example of FIG. 8, the radio signal $V_{RF}$ is "1" when the pulse $V_{PULSE}$ is generated.

During an interval in which the pulse $V_{PULSE}$ is provided to the RX main block 720 of FIG. 7, the receiver operates and receives and outputs the radio signal $V_{RF}$. During an interval in which the pulse $V_{PULSE}$ is not provided, the receiver does not operate and continues to output a previously received signal. The pulse $V_{PULSE}$ is provided during a time $T_{PULSE}$. The time $T_{PULSE}$ is greater than or equal to a startup time $T_{SET}$. The startup time $T_{SET}$ will be described with reference to FIG. 9.

The oscillation signal $V_{OSC}$ is generated based on the radio signal $V_{RF}$ in an oscillator driven by the pulse $V_{PULSE}$. For example, when an amplitude of the oscillation signal $V_{OSC}$ is very small, it may be difficult to generate an effective output in the TDC. In this example, the oscillation signal $V_{OSC}$ is amplified using at least one RF amplifier. In FIG. 8, $V_{OSC1}$ and $V_{OSC2}$ represent amplified oscillation signals.

The TDC outputs an output count $N_{OUT}$ proportional to an oscillation time $t_1$ based on the amplified oscillation signal $V_{OSC2}$. For example, the TDC outputs the output count $N_{OUT}$ proportional to the oscillation time $t_1$ by continuing to increment the output count $N_{OUT}$ as long as an amplitude of the amplified oscillation signal $V_{OSC2}$ is greater than or equal to a threshold amplitude. The TDC continues to output the output count $N_{OUT}$ until a reset signal is input to the TDC.

Figure 9:
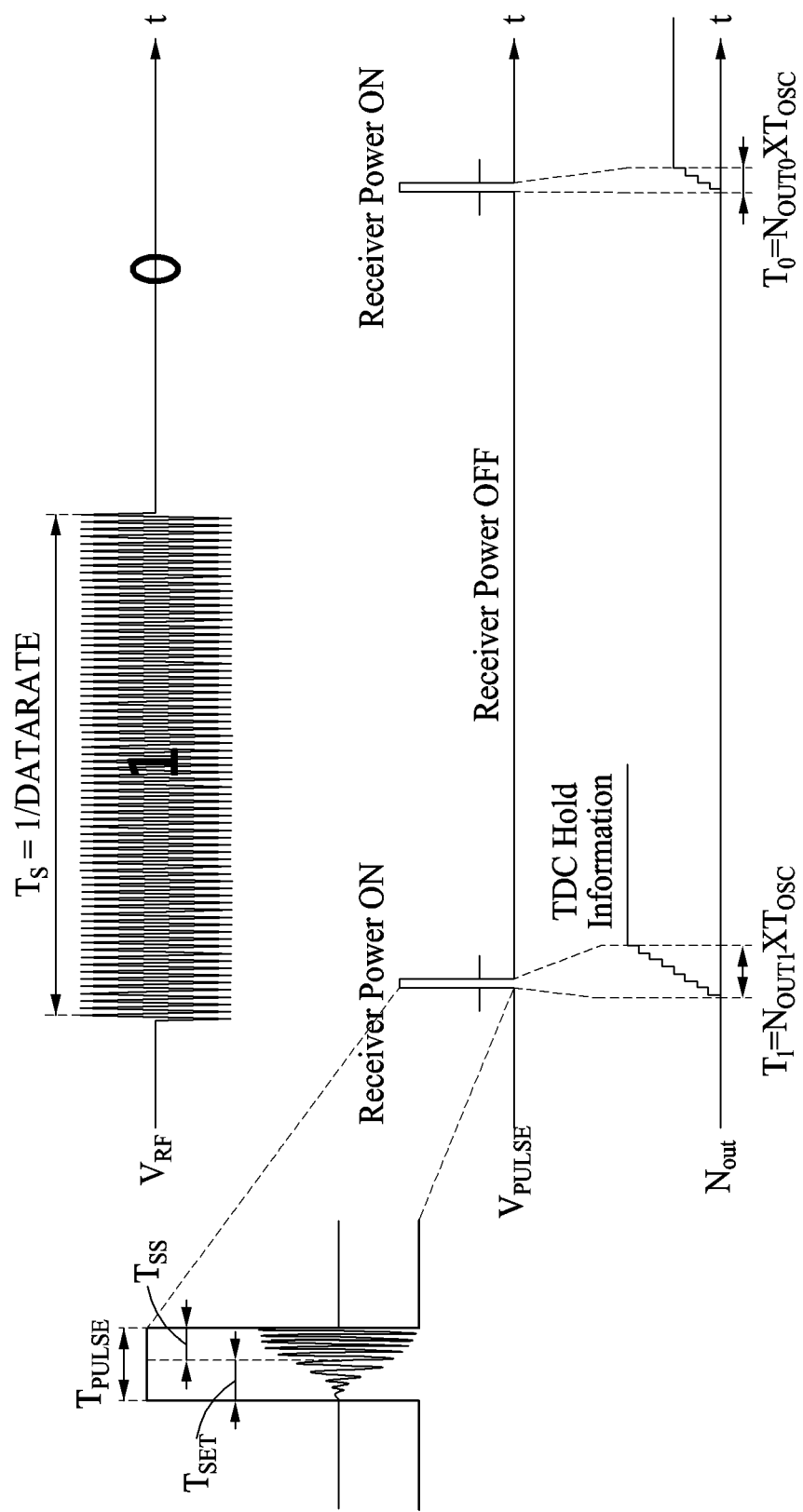
FIG. 9 illustrates an example of a procedure of generating an output of a TDC based on a radio signal.

FIG. 9 illustrates an example of a procedure of generating an output of a TDC based on a radio signal.

FIG. 9 illustrates a startup time $T_{SET}$ and an operation time $T_{SS}$ of a TDC.

A receiver is powered on during an interval in which the pulse $V_{PULSE}$ is generated. The receiver operates based on impulse-based carrier sensing (IBCS) so that the receiver is powered on during an interval in which the pulse $V_{PULSE}$ is generated, and powered off during an interval in which the pulse $V_{PULSE}$ is not generated.

A width $T_{PULSE}$ of the pulse $V_{PULSE}$ is divided into the startup time $T_{SET}$ and the operation time $T_{SS}$ of the TDC. The startup time $T_{SET}$ is an interval in which an output is not generated in the TDC because an amplitude of an oscillation signal is less than a threshold amplitude. The operation time $T_{SS}$ is be an interval in which an output is generated in the TDC because the amplitude of the oscillation signal is greater than or equal to the threshold amplitude. The width $T_{PULSE}$ of the pulse $V_{PULSE}$ is expressed by Equation 1 below.

$$T_{PULSE} = T_{SET} + T_{SS} \qquad (1)$$
$$= T_{SET} + N_{OUT} \times T_{OSC}$$
$$N_{OUT} = f_{OSC} \times T_{PULSE}$$

In Equation 1, $T_{OSC}$ denotes an oscillation period of an oscillator and $f_{OSC}$ denotes an oscillation frequency of the oscillator, where $f_{OSC}$ is a high frequency and may also be referred to as a carrier frequency.

According to Equation 1, when the startup time $T_{SET}$ is reduced, or when the oscillation frequency $f_{OSC}$ increases, the width $T_{PULSE}$ of the pulse $V_{PULSE}$ is effectively reduced, and thus power consumption in the receiver is also reduced.

In FIG. 9, $T_1$ represents a time measured in the TDC when the radio signal $V_{RF}$ is "1" and $T_0$ represents a time measured in the TDC when the radio signal $V_{RF}$ is "0".

In the example of FIG. 9, the radio signal $V_{RF}$ is modulated by OOK. However, this is merely one example, and the modulation is not limited to OOK. When the radio signal $V_{RF}$ is modulated by ASK, an output count $N_{OUT}$ of the TDC is proportional to the amplitude of the radio signal $V_{RF}$ so that the radio signal $V_{RF}$ is received without restrictions. Also, when the radio signal $V_{RF}$ is modulated by FSK, the output count $N_{OUT}$ of the TDC is inversely proportional to a frequency difference between a frequency of the radio signal $V_{RF}$ and the oscillation frequency of the oscillation signal, whereby the radio signal $V_{RF}$ is received without restrictions. That is, the smaller the frequency difference, that is, the closer the frequency of the radio signal $V_{RF}$ is to the oscillation frequency of the oscillation signal, the greater the output count $N_{OUT}$ is. Conversely, the greater the frequency difference, that is, the farther the frequency of the radio signal $V_{RF}$ is from the oscillation frequency of the oscillation signal, the smaller the output count $N_{OUT}$ is.

Figure 10:
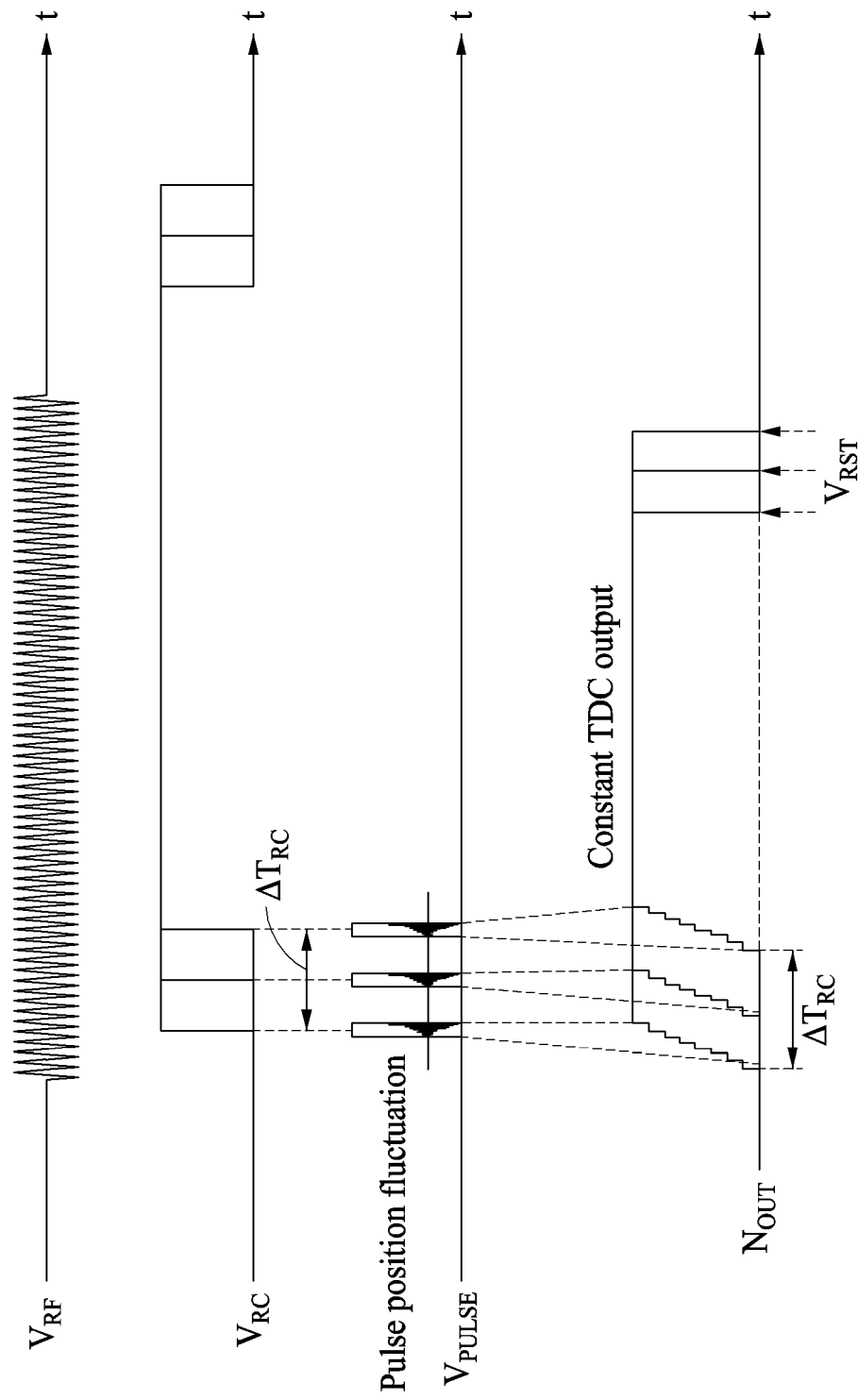
FIG. 10 illustrates an example of an output of a TDC that is not affected by jitter of a clock generator.

FIG. 10 illustrates an example of an output of a TDC that is not affected by jitter of a clock generator.

FIG. 10 illustrates a radio signal $V_{RF}$, a clock signal $V_{RC}$ generated in a clock generator, and a pulse $V_{PULSE}$ generated in a pulse generator.

The clock signal $V_{RC}$ includes jitter. Jitter is a phenomenon in which a period of the clock generator generating the clock signal $V_{RC}$ deviates from its nominal value. An oscillator generates the pulse $V_{PULSE}$ at a rising edge of the clock signal $V_{RC}$. In this example, the jitter causes a pulse position fluctuation denoted by $\Delta T_{RC}$ to appear at the rising edge of the clock signal $V_{RC}$.

A position fluctuation occurs in an output count $N_{OUT}$ of a TDC due to the pulse position fluctuation. Also, a point in time at which an output of the TDC is reset is changed based on a reset signal $V_{RST}$. As described above, a receiver receives the radio signal $V_{RF}$ based on the output count $N_{OUT}$ of the TDC, and thus is not affected by the jitter of the clock generator. The output count $N_{OUT}$ of the TDC is proportional to a width of the pulse $V_{PULSE}$ and an oscillation frequency of an oscillation signal, and is not affected by the jitter of the clock generator. The receiver receives the radio signal $V_{RF}$ robustly despite the jitter of the clock generator therein.

Figure 11:
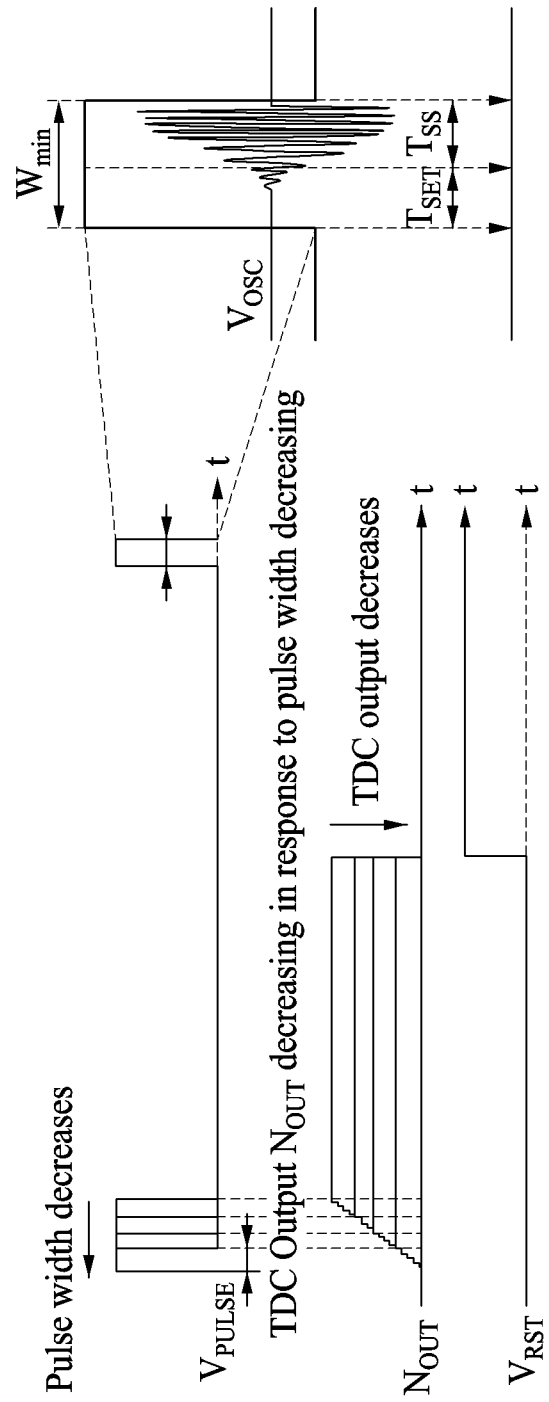
FIG. 11 illustrates an example of a TDC output change based on a change in a width of a pulse.

FIG. 11 illustrates an example of a TDC output change based on a change in a width of a pulse.

FIG. 11 illustrates a pulse $V_{PULSE}$, an output count $N_{OUT}$ of a TDC, and a reset signal $V_{RST}$.

When a width of the pulse $V_{PULSE}$ is decreased to reduce power consumption of a receiver, the output count $N_{OUT}$ of the TDC also decreases. However, there is a limit to how much the width of the pulse $V_{PULSE}$ can be reduced and still be effective to operate the TDC. Thus, a minimum width of the pulse $V_{PULSE}$ is a width that enables the TDC to output an effective output count $N_{OUT\_effective}$ that is capable of receiving a radio signal.

A minimum pulse width $W_{min}$ and a minimum duty cycle $D_{min}$ of the pulse $V_{PULSE}$ are determined using Equation 2 below. The minimum duty cycle $D_{min}$ is a ratio of an interval in which the pulse $V_{PULSE}$ is high to an interval at which the pulse $V_{PULSE}$ is generated.

$$W_{min} = (N_{OUT\_effective} \times T_{OSC}) + T_{SET} \qquad (3)$$
$$= T_{SET} + T_{SS}$$
$$D_{min} = \frac{(N_{OUT\_effective} + f_{OSC} \cdot T_{SET}) \times f_{RC}}{f_{OSC}}$$

In Equation 2, $f_{RC}$ denotes a frequency of a clock generator. It can be seen from Equation 2 that the minimum pulse width $W_{min}$ is proportional to a startup time $T_{SET}$ of an oscillator.

An average power consumption of the receiver is determined using Equation 3 below.

$$P_{AVE} = P_{RX} \times D_{min} \qquad (3)$$
$$= \frac{P_{RX} \cdot (N_{OUT\_effective} + f_{OSC} \cdot T_{SET}) \cdot f_{RC}}{f_{OSC}}$$
$$\approx \frac{P_{RX} \cdot T_{SET}}{T_{RC}}$$

In Equation 3, $P_{RX}$ denotes a power consumption of the receiver, and $T_{RC}$ denotes a period of the clock generator. It can be seen from Equation 3 that the average power consumption $P_{AVE}$ of the receiver is proportional to the startup time $T_{SET}$ of the oscillator. Thus, the startup time $T_{SET}$ is to be minimized to minimize the power consumption of the receiver. A fast startup method that minimizes the startup time $T_{SET}$ will be described with reference to FIGS. 12 and 13.

Figure 12:
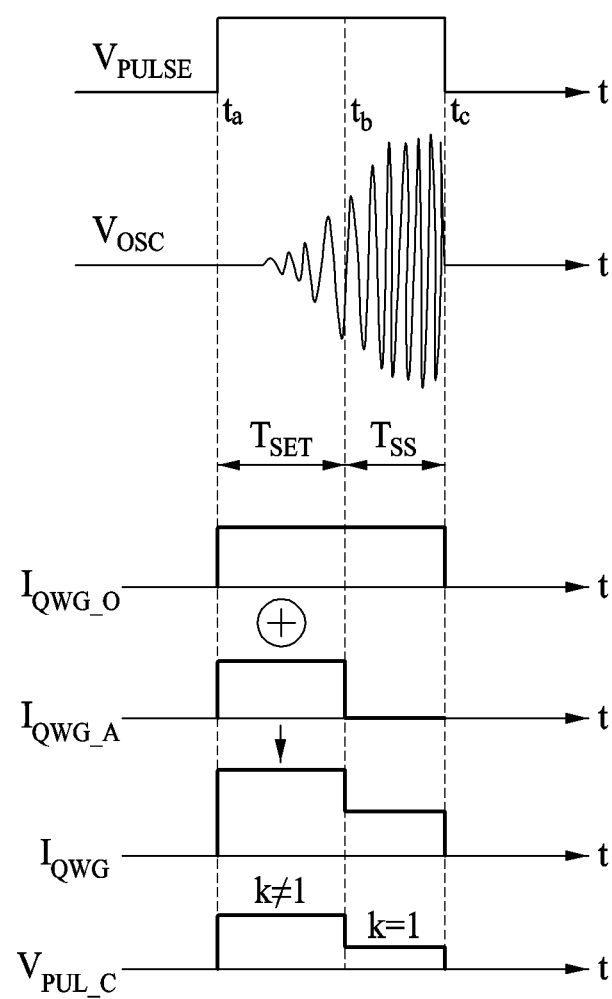
FIG. 12 illustrates an example of a fast startup of a receiver.

FIG. 12 illustrates an example of a fast startup of a receiver.

Referring to FIG. 12, FIG. 12 illustrates an additional current $I_{QWG\_A}$ for a fast startup and a control voltage $V_{PUL\_C}$ for controlling whether capacitors of a tank circuit of an oscillator have equal or unequal values.

A startup time $T_{SET}$ is an oscillation startup interval for generating an oscillation signal $V_{OSC}$. The TDC does not generate an output in the oscillation startup interval. In the oscillation startup interval, a receiver is powered on to receive the radio signal $V_{RF}$, which consumes power. The power consumption of the receiver is minimized by minimizing the startup time $T_{SET}$. The startup time $T_{SET}$ is minimized by the fast startup as follows.

In one example, the fast startup is achieved by controlling a current $I_{QWG}$ provided to an oscillator. A base current $I_{QWG\_O}$ provided to the oscillator is constant during a period of time from a start point in time $t_a$ corresponding to a rising edge of a pulse $V_{PULSE}$ to an end point in time $t_c$ corresponding to a falling edge of the pulse $V_{PULSE}$. In this example, the additional current $I_{QWG\_A}$ for the fast startup is provided to the oscillator. The additional current $I_{QWG\_A}$ is provided to the oscillator during a period of time from the start point in time $t_a$ to an intermediate point in time $t_b$.

Due to the base current $I_{QWG\_O}$ and the additional current $I_{QWG\_A}$, the current $I_{QWG}$ provided to the oscillator is greater in a first period of time from the start point in time $t_a$ to the intermediate point in time $t_b$ than in a second period of time from the intermediate point in time $t_b$ to the end point in time $t_c$. As such, the startup time $T_{SET}$ is minimized by controlling the current $I_{QWG}$.

Figure 13:
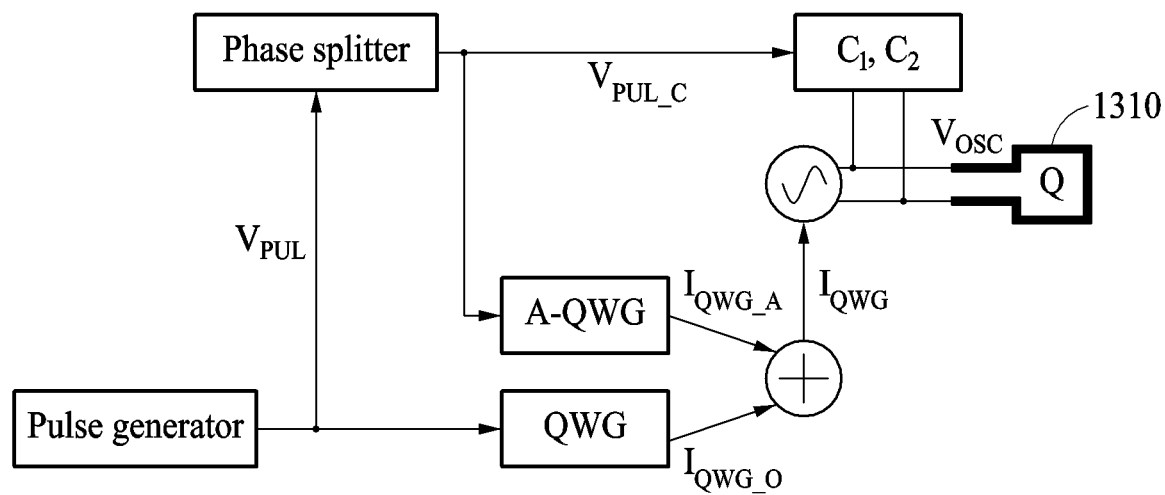
FIG. 13 illustrates an example of a receiver having a fast startup function.

FIG. 13 illustrates an example of a receiver having a fast startup function.

Referring to FIG. 13, a receiver includes an antenna 1310, a pulse generator, a phase splitter, a current supplier QWG that outputs the base current $I_{QWG\_O}$, a current supplier A-QWG that outputs the additional current $I_{QWG\_A}$, an adder that adds the base current $I_{QWG\_O}$ and additional current $I_{QWG\_A}$ to obtain the current $I_{QWG}$, the oscillator, and capacitors $C_1$ and $C_2$.

In this example, the fast startup is achieved by controlling a plurality of capacitors applied to the oscillator. In the example illustrated in FIG. 13, the oscillator is an LC-oscillator including a tank circuit formed by the antenna 1310 and the capacitors $C_1$ and $C_2$. The antenna 1310 serves as an inductor of the tank circuit. The capacitors $C_1$ and $C_2$ are connected to differential nodes of the oscillator and are voltage-controlled capacitors having capacitances controlled by the control voltage $V_{PUL\_C}$ as shown in Equation 4 below.

$$C_1 = \frac{1+k}{k} \times C_0 \quad (4)$$
$$C_2 = (1+k) \times C_0$$

When the capacitances of the two capacitors $C_1$ and $C_2$ are varied according to Equation 4, an oscillation frequency of the oscillator remains constant. Also, whether the two capacitors $C_1$ and $C_2$ have equal or unequal values is controlled by controlling a value k that appears in Equation 4 above using the control voltage $V_{PUL\_C}$.

The control voltage $V_{PUL\_C}$ is controlled so that the value k is a value other than 1, for example, a value between 1.8 and 2.0, during the first period of time from the start point in time $t_a$ to the intermediate point in time $t_b$. This controls the capacitors $C_1$ and $C_2$ to have unequal values during the first period of time from the start point in time $t_a$ to the intermediate point in time $t_b$. For example, for k=2.0, $C_1=(3/2)C_0$ and $C_2=3C_0$. Also, the control voltage $V_{PUL\_C}$ is controlled so that the value k is 1 during the second period of time from the intermediate point in time $t_b$ to the end point in time $t_c$. This controls the capacitors $C_1$ and $C_2$ to have equal values during the second period of time from the intermediate point in time $t_b$ to the end point in time $t_c$. For k=1, $C_1=2C_0$ and $C_2=2C_0$. Thus, the capacitors $C_1$ and $C_2$ are controlled to have unequal values, i.e., to be asymmetric to each other, during the first period of time from the start point in time $t_a$ to the intermediate point in time $t_b$, and controlled to have equal values, i.e., to be symmetric to each other, during the second period of time from the intermediate point in time $t_b$ to the end point in time $t_c$, thereby minimizing the startup time $T_{SET}$.

In still another example, the fast startup is achieved by using an inductor having a Q-value greater than or equal to a threshold in the tank circuit of the oscillator. In this example, the oscillator is an LC-oscillator in which the antenna 1310 serves as the inductor.

The startup time $T_{SET}$ is expressed by Equation 5 below.

$$T_{SET} \propto \sqrt{\ln(10) \times \frac{2Q}{g_m w_0 R_T}} \quad (5)$$
$$\propto \sqrt{\ln(10) \times \frac{2Q}{I_{QWG} w_0 R_T}}$$

In Equation 5, $g_m$ denotes a transconductance of a core transistor of the oscillator, $w_0$ denotes an oscillation frequency of the oscillator, and $R_T$ denotes an output resistance of the oscillator. The core transistor of the oscillator is not shown in FIG. 13. $R_T$ is proportional to a square of the Q-value. Thus, when the Q-value of the inductor in the tank circuit of the oscillator increases, the startup time $T_{SET}$ decreases.

Although FIG. 12 illustrates that the intermediate point in time $t_b$ is a boundary point between the startup time $T_{SET}$ and the operation time $T_{SS}$ of the TDC, the intermediate point in time $t_b$ may also be a point between the start point in time $t_a$ and the end point in time $t_c$, for example, a point in time that divides the period of time from the start point in time $t_a$ to the end point in time $t_c$ in half.

Figure 14:
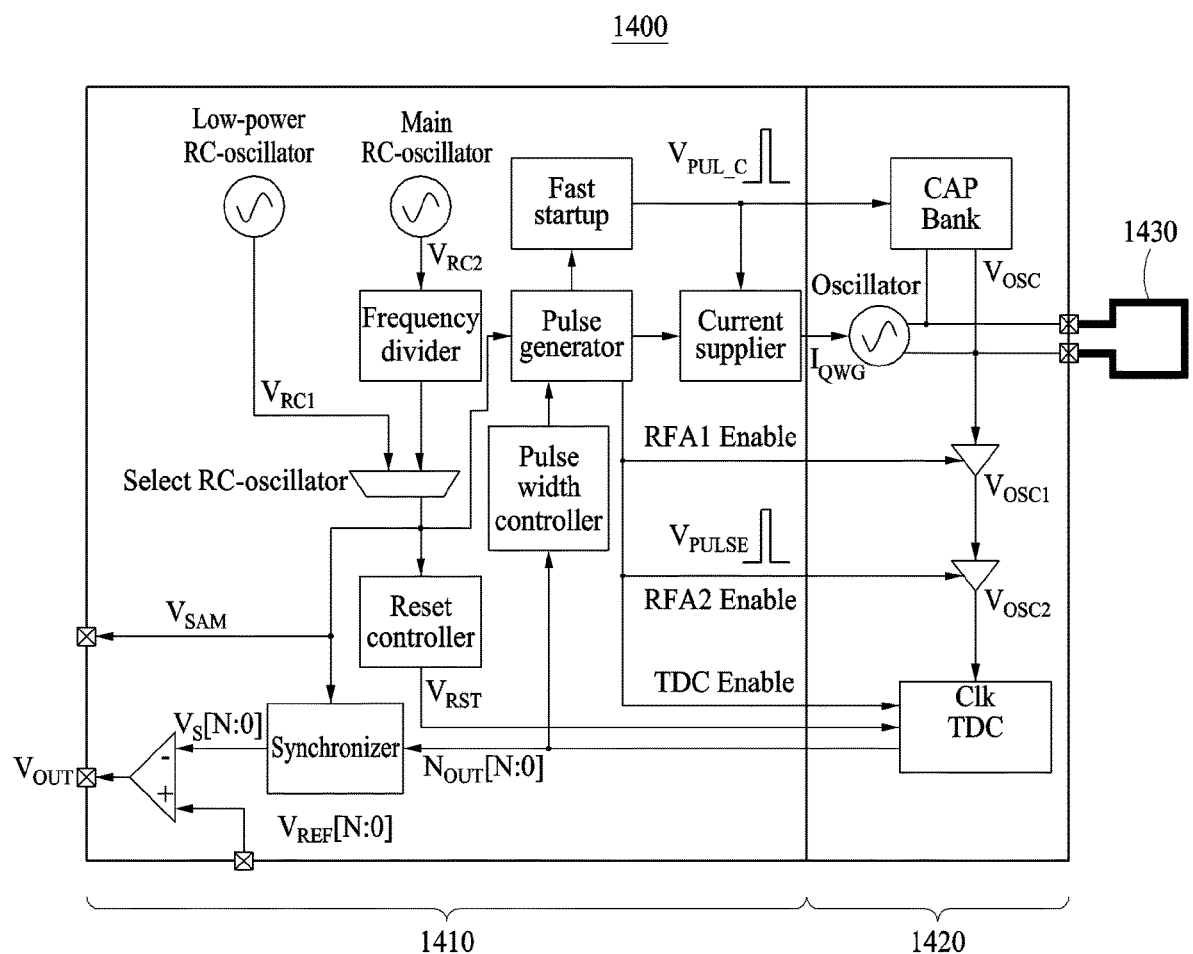
FIG. 14 illustrates an example of a receiver including a pulse width controller.

FIG. 14 illustrates an example of a receiver including a pulse width controller.

Referring to FIG. 14, a receiver 1400 includes a controller 1410, a receiving main block 1420, and an antenna 1430. The receiver 1400 is, for example, an RF transceiver.

The controller 1410 generates a pulse $V_{PULSE}$ and provides the pulse $V_{PULSE}$ to the receiving main block 1420. The controller 1410 includes a low-power RC-oscillator and a main RC-oscillator having different oscillation frequencies as clock generators. The low-power RC-oscillator is a clock generator configured to generate a clock signal having a lower frequency than a clock signal generated by the main RC-oscillator. When the low-power RC-oscillator is used, the pulse $V_{PULSE}$ is generated in a pulse generator at an interval of a relatively long period. In this example, a power consumption of the receiver 1400 is less when compared to a case in which the main RC-oscillator is used. In FIG. 14, a clock signal $V_{RC1}$ is a clock signal generated in the low-power RC-oscillator, and a clock signal $V_{RC2}$ is a clock signal generated in the main RC-oscillator.

The controller 1410 selects one of the low-power RC-oscillator and the main RC-oscillator based on a frequency of a radio signal received by the antenna 1430. An oscillator capable of generating a clock signal at a frequency that is at least twice the frequency of the radio signal is selected from the low-power RC-oscillator and the main RC-oscillator. When both the low-power RC-oscillator and the main RC-oscillator have frequencies that are at least twice the frequency of the radio signal, the low-power RC-oscillator is selected so that the power consumption of the receiver 1400 is reduced.

A current supplier provides a current $I_{QWG}$ to an oscillator and corresponds to QWG and A-QWG of FIG. 13. Also, a fast startup circuit generates a control voltage $V_{PUL\_C}$ for controlling whether capacitors of a tank circuit of an oscillator have equal or unequal values, and corresponds to a phase splitter of FIG. 13. A CAP bank includes a plurality of capacitors and corresponds to the capacitors $C_1$ and $C_2$ of FIG. 13. The antenna 1430 and the plurality of capacitors of the CAP bank form a tank circuit of the oscillator. The antenna 1430 serves as an inductor of the tank circuit.

A pulse width controller controls a width of the pulse $V_{PULSE}$ generated in the oscillator. The pulse width controller controls the width of the pulse $V_{PULSE}$ based on an output count $N_{OUT}$ of a TDC. As the width of the pulse $V_{PULSE}$ increases, an operation time of the receiver 1400 increases and the power consumption of the receiver 1400 also increases. Thus, the width of the pulse $V_{PULSE}$ is minimized to minimize the power consumption of the receiver 1400. When the pulse $V_{PULSE}$ is excessively reduced, an effective output is not generated in the TDC. Thus, the pulse width controller minimizes the width of the pulse $V_{PULSE}$ within a range in which the effective output is generated in the TDC.

The width of the pulse $V_{PULSE}$ may be adjusted based on a radio signal, for example, "1, 0, 1, 0", received by the antenna 1430. For example, based on the output counts $N_{OUT}$ of the TDC produced by the radio signal "1, 0, 1, 0 ", the pulse width controller adjusts the width of the pulse $V_{PULSE}$ to a minimum width that still enables the radio signal to be effectively received.

The description of FIGS. 1 through 13 is also applicable to FIG. 14, but will not be repeated here for brevity.

Figure 15:
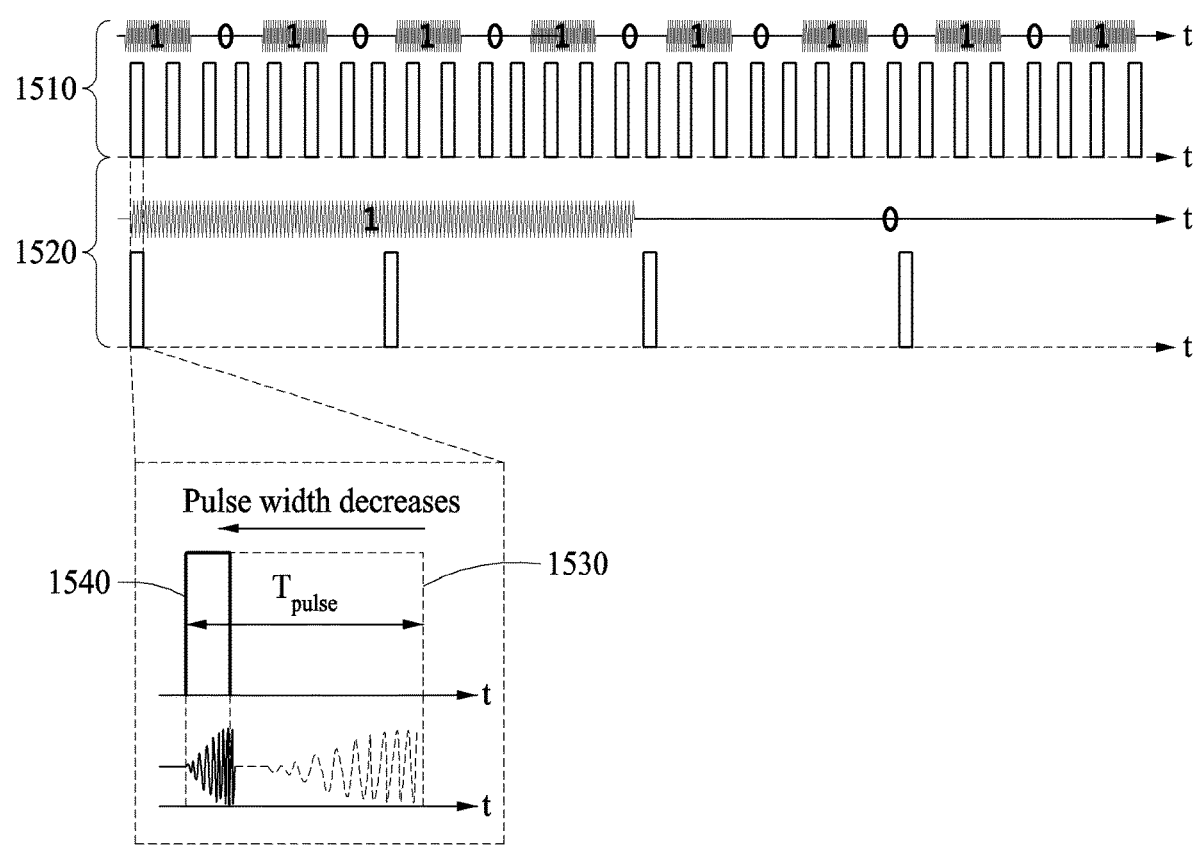
FIG. 15 illustrates an example of a power consumption of a receiver.

FIG. 15 illustrates an example of a power consumption of a receiver.

FIG. 15 illustrates cases in which a pulse width and a data rate affect a power consumption of a receiver.

A data rate affects a power consumption of a receiver. In a case 1510 and a case 1520, radio signals having different data rates are received. A pulse period is to be less than or equal to ½ times an OOK modulation period of a radio signal. Because of this, the receiver is powered on to operate more frequently in the case 1510 having a higher data rate than in the case 1520 having a lower data rate. Thus, the receiver uses a smaller amount of power in the case 1520 than in the case 1510. As the data rate of the radio signal decreases, the power consumption of the receiver decreases.

Also, the pulse width affects the power consumption of the receiver. A case 1530 and a case 1540 represent examples associated with different pulse widths. Since the receiver is powered on and operates during an interval in which a pulse is high, the power consumption of the receiver increases proportionally to the pulse width. Thus, the receiver uses a smaller amount of power in the case 1540 in which the pulse width is smaller than in the case 1530 in which the pulse width is larger. As the pulse width decreases, the power consumption of the receiver decreases.

Figure 16:
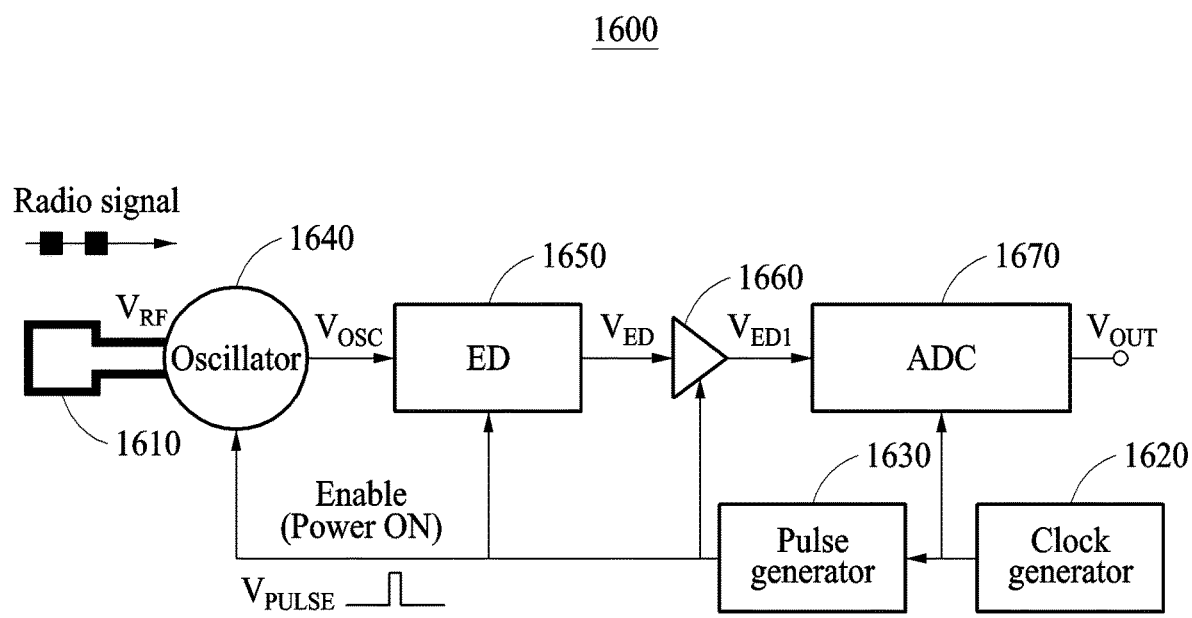
FIG. 16 illustrates an example of a receiver including an envelope detector (ED).

FIG. 16 illustrates an example of a receiver including an envelope detector (ED).

Referring to FIG. 16, a receiver 1600 includes an antenna 1610, a clock generator 1620, a pulse generator 1630, an oscillator 1640, an ED 1650, an RF amplifier 1660, and an analog-to-digital converter (ADC) 1670. The measurer 140 of FIG. 1 corresponds to, for example, the ED 1650. In this example, the receiver 1600 receives a radio signal $V_{RF}$ based on an envelope $V_{ED}$ of an oscillation signal $V_{OSC}$ detected using the ED 1650.

The radio signal $V_{RF}$ is received by the antenna 1610. The clock generator 1620 generates a clock signal and provides the clock signal to the pulse generator 1630. The pulse generator 1630 generates a pulse $V_{PULSE}$ at an interval of a predetermined period based on the received clock signal. The oscillator 1640 may be an LC-oscillator driven by the pulse $V_{PULSE}$ to generate the oscillation signal $V_{OSC}$ based on the radio signal $V_{RF}$.

Since the description of FIGS. 1 through 15 is also applicable to the antenna 1610, the clock generator 1620, the pulse generator 1630, and the oscillator 1640, repeated description will be omitted.

The ED 1650 detects the envelope $V_{ED}$ of the oscillation signal $V_{OSC}$. The detected envelope $V_{ED}$ is amplified by the RF amplifier 1660. In FIG. 16, $V_{ED1}$ represents an amplified envelope. Although FIG. 16 illustrates one RF amplifier as one example, the receiver 1600 may include two or more RF amplifiers without restriction.

The ADC 1670 converts the envelope $V_{ED}$ in an analog form into a digital signal. The digital signal obtained in the ADC 1670 is compared to a threshold, and the radio signal $V_{RF}$ is received based on a result of the comparison. When the digital signal is greater than or equal to the threshold, the radio signal $V_{RF}$ is received as "1". When the digital signal is less than the threshold, the radio signal $V_{RF}$ is received as "0". In FIG. 16, a received signal is output as a received signal $V_{OUT}$.

Figure 17:
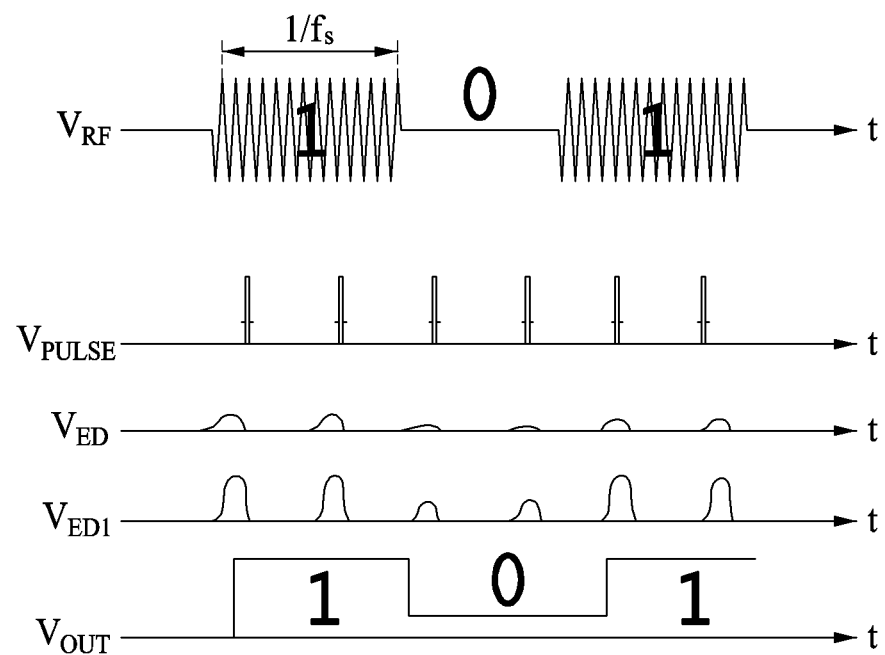
FIG. 17 illustrates an example of a procedure of receiving a radio signal in the receiver of FIG. 16.

FIG. 17 illustrates an example of a procedure of receiving a radio signal in the receiver of FIG. 16.

FIG. 17 illustrates a radio signal $V_{RF}$, a pulse $V_{PULSE}$, an envelope signal $V_{ED}$, an amplified envelope signal $V_{ED1}$, and a received signal $V_{OUT}$.

The pulse $V_{PULSE}$ is generated at a frequency that is at least twice a frequency of the radio signal $V_{RF}$. When the pulse $V_{PULSE}$ is high, an oscillation signal is generated in an oscillator and the envelope signal $V_{ED}$ of the oscillation signal is detected. The envelope signal $V_{ED}$ is amplified by an RF amplifier. An amplitude of the amplified envelope signal $V_{ED1}$ is compared to a threshold amplitude. The received signal $V_{OUT}$ is output based on a result of the comparison.

Figure 18:
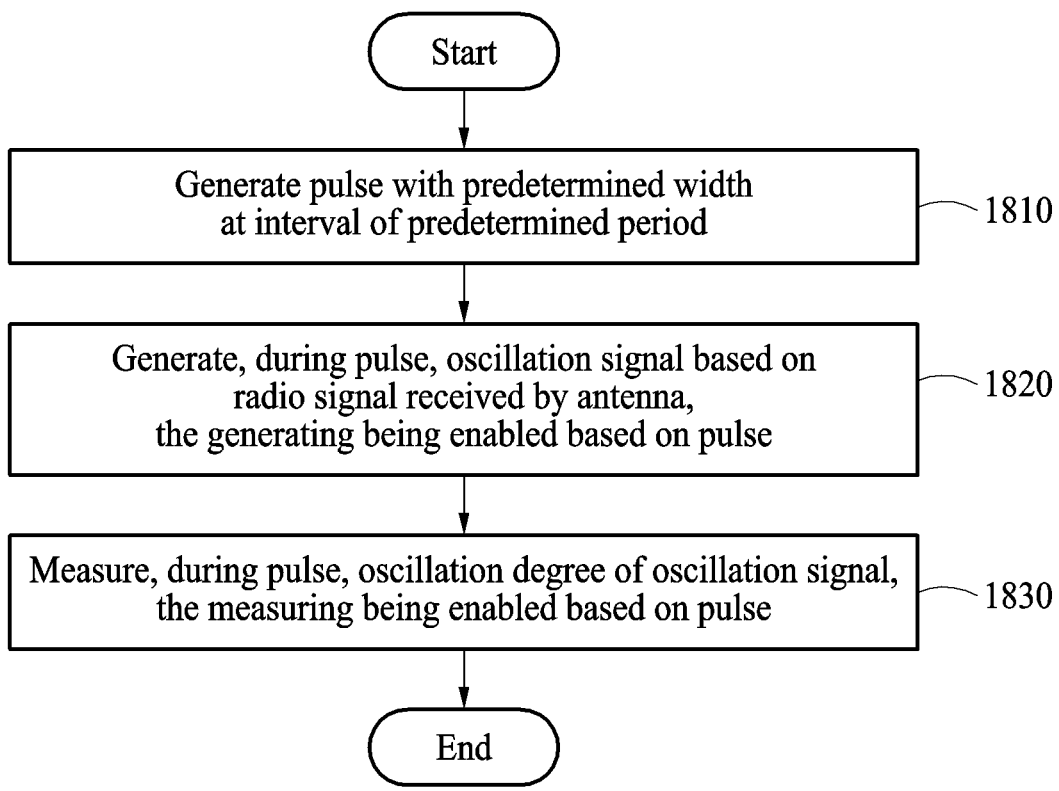
FIG. 18 illustrates an example of a reception method.

FIG. 18 illustrates an example of a reception method.

Referring to FIG. 18, the reception method is performed by a receiver.

In operation 1810, the receiver generates a pulse with a predetermined width at an interval of a predetermined period. The predetermined period is, for example, a period less than or equal to ½ times an OOK modulation period of a radio signal received by an antenna.

In operation 1820, the receiver generates, during the pulse, an oscillation signal based on the radio signal received by the antenna. The generating is enabled based on the pulse. When the input radio signal is "1", the receiver more quickly initiates an oscillation and performs the oscillation during a longer period of time than in a case in which the input radio signal is "0".

In operation 1830, the receiver measures, during the pulse, an oscillation degree of the oscillation signal. The measuring is enabled based on the pulse. When the receiver includes a TDC, the receiver generates an output of the TDC proportional to an oscillation time of the oscillation signal as the oscillation degree of the oscillation signal. When the receiver includes an ED, the receiver detects an envelope of the oscillation signal as the oscillation degree of the oscillation signal.

A radio signal is received based on the measured oscillation degree. For example, the radio signal is received based on whether the generated output of the TDC is greater than or equal to a threshold. Alternatively, the radio signal is received based on whether an amplitude of the detected envelope is greater than or equal to a threshold.

Based on the aforementioned reception method, a receiver is provided with a low power consumption and a high receive sensitivity and without latency. Also, the receiver minimizes an active interval based on a short pulse and generally operates in a turn-off state, thereby minimizing the power consumption. Also, the receiver is powered on at an interval of a period less than or equal to ½ times an OOK modulation period of a radio signal. This causes the receiver to operate in a minimum active interval without latency, thereby minimizing an average power consumption.

The description of FIGS. 1 through 17 is also applicable to FIG. 18, but will not be repeated here for brevity.

Figure 19:
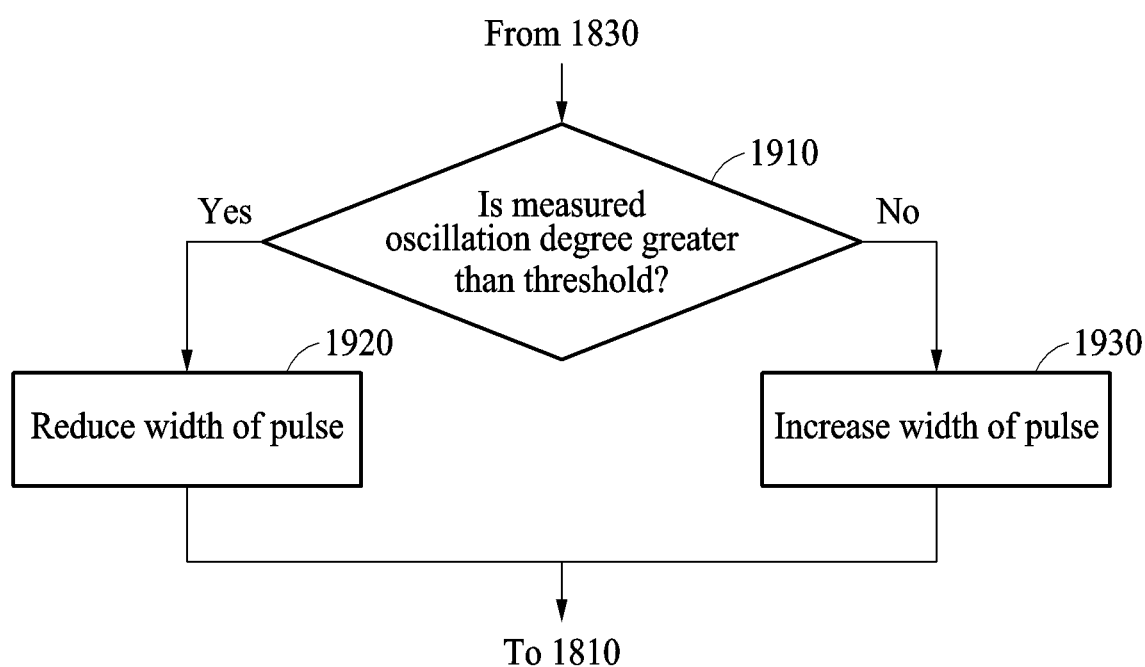
FIG. 19 illustrates an example of a method of controlling a width of a pulse generated in a pulse generator.

FIG. 19 illustrates an example of a method of controlling a width of a pulse generated in a pulse generator.

Referring to FIG. 19, a procedure of controlling a width of a pulse is performed by a receiver.

In operation 1910, the receiver determines whether a measured oscillation degree is greater than or equal to a threshold. When the receiver includes a TDC, the receiver determines whether an output generated in the TDC is greater than or equal to the threshold. When the receiver includes an ED, the receiver determines whether an amplitude of a detected envelope is greater than or equal to the threshold.

When the measured oscillation degree is greater than or equal to the threshold, the receiver reduces a width of a pulse output from a pulse generator in operation 1920. For example, the receiver reduces the width of the pulse by a predetermined amount or ratio.

When the measured oscillation degree is less than the threshold, the receiver increases the width of the pulse output from the pulse generator in operation 1930. For example, the receiver increases the width of the pulse by a predetermined amount or ratio.

After the width of the pulse is controlled in operation 1920 or 1930, operation 1810 is repeated.

The description of FIGS. 1 through 18 is also applicable to FIG. 19, but will not be repeated here for brevity.

Although the examples described above include various "greater than or equal to" conditions, these conditions may alternatively be "greater than" conditions.

The receiver 100, the antenna 110, the pulse generator 120, the oscillator 130, and the measurer 140 in FIG. 1, the receiver 200, the antenna 210, the clock generator 220, the pulse generator 230, the oscillator 240, and the time-to-digital converter (TDC) 250 in FIG. 2, the receiver 700, the controller 710 and all of its components, the receiving main block 720 and all of its components, and the antenna 730 in FIG. 7, the antenna 1310, the pulse generator, the phase splitter, the current supplier QWG, the current supplier A-QWG, the adder, the oscillator, and the capacitors $C_1$ and $C_2$ in FIG. 13, the receiver 1400, the controller 1410 and all of its components, the receiving main block 1420 and all of its components, and the antenna 1430 in FIG. 14, and the receiver 1600, the antenna 1610, the clock generator 1620, the pulse generator 1630, the oscillator 1640, the envelope detector (ED) 1650, the RF amplifier 1660, and the analog-to-digital-converter (ADC) 1670 in FIG. 16 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3-6, 8-12, 15, and 17-19 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A receiver comprising:
an antenna configured to receive a radio signal;
a pulse generator configured to generate a pulse;
an oscillator configured to be driven based on the pulse to generate an oscillation signal based on the radio signal; and
a measurer configured to be driven based on the pulse to measure an oscillation degree of the oscillation signal,
wherein the radio signal is determined based on whether the oscillation degree of the oscillation signal is greater than or equal to a threshold.

2. The receiver of claim 1, wherein the measurer is further configured to measure an oscillation time of the oscillation signal as the oscillation degree of the oscillation signal, and the radio signal is received based on the oscillation time of the oscillation signal.

3. The receiver of claim 2, wherein the measurer is further configured to generate an output proportional to the oscillation time of the oscillation signal, and
the radio signal is received based on whether the generated output is greater than or equal to a threshold.

4. The receiver of claim 2, wherein the radio signal is received as a first value in response to the oscillation time being greater than or equal to a threshold time, and received as a second value different from the first value in response to the oscillation time being less than the threshold time.

5. The receiver of claim 2, wherein an amplitude or a frequency of the radio signal received by the antenna is received based on the oscillation time of the oscillation signal.

6. The receiver of claim 1, further comprising a current supplier configured to:
provide a first current to the oscillator in a first period of time from a start point in time of the pulse to an intermediate point in time between the start point in time of the pulse and an end point in time of the pulse, and
provide a second current smaller than the first current to the oscillator in a second period of time from the intermediate point in time to the end point in time of the pulse.

7. The receiver of claim 1, wherein the oscillator comprises a tank circuit comprising a plurality of capacitors, and
the plurality of capacitors have unequal values in a first period of time from a start point in time of the pulse to an intermediate point in time between the start point in time of the pulse and an end point in time of the pulse, and equal values in a second period of time from the intermediate point in time to the end point in time of the pulse.

8. The receiver of claim 1, further comprising an inductor having a Q-value greater than or equal to a threshold applied to the oscillator.

9. The receiver of claim 1, wherein the measurer is further configured to generate an output proportional to an oscillation time of the oscillator, and
the pulse generator is further configured to adjust a width of the pulse based on the output generated by the measurer.

10. The receiver of claim 1, wherein the measurer is further configured to generate an output proportional to an oscillation frequency of the oscillation signal and a width of the pulse based on an oscillation time of the oscillation signal.

11. The receiver of claim 1, wherein the pulse generator is further configured to generate the pulse at an interval of a period less than or equal to ½ times an on-off keying (OOK) modulation period of the radio signal.

12. The receiver of claim 1, wherein the measurer is further configured to detect an envelope of the oscillation signal as the oscillation degree of the oscillation signal, and
the radio signal is received based on the envelope of the oscillation signal.

13. The receiver of claim 12, wherein the measurer is further configured to measure an amplitude of the detected envelope of the oscillation signal, and
the radio signal is received based on whether the amplitude of the detected envelope is greater than or equal to a threshold.

14. The receiver of claim 1, wherein the oscillator and the measurer are further configured to operate during an interval in which the oscillator and the measurer receive the pulse from the pulse generator.

15. The receiver of claim 1, wherein a power consumption of the receiver is determined by a data rate of the radio signal and a width of the pulse.

16. The receiver of claim 1, further comprising a radio frequency (RF) amplifier configured to be driven based on the pulse to amplify the oscillation signal and output the amplified oscillation signal to the measurer.

17. A reception method comprising:
generating a pulse at an interval of a predetermined period;
generating, during the pulse, an oscillation signal based on a radio signal received by an antenna, the generating being enabled based on the pulse; and
measuring, during the pulse, an oscillation degree of the oscillation signal, the measuring being enabled based on the pulse,
wherein the radio signal is determined based on whether the oscillation degree of the oscillation signal is greater than or equal to a threshold.

18. The reception method of claim 17, wherein the measuring comprises generating an output proportional to an oscillation time of the oscillation signal as the oscillation degree of the oscillation signal, and
the radio signal is received based on whether the generated output is greater than or equal to a threshold.

19. The reception method of claim 17, wherein the measuring comprises detecting an envelope of the oscillation signal as the oscillation degree of the oscillation signal, and
the radio signal is received based on whether an amplitude of the detected envelope is greater than or equal to a threshold.

20. A non-transitory computer-readable medium storing instructions that, when executed by a processor, cause the processor to perform the reception method of claim 17.

21. A receiver comprising:
an antenna configured to receive a radio signal;
a pulse generator configured to generate a pulse at an interval of a predetermined period;
an oscillator configured to be powered on by the pulse to generate an oscillation signal based on the radio signal only while the pulse is present; and
a measurer configured to be powered on by the pulse to measure a parameter of the oscillation signal depending on the radio signal only while the pulse is present,
wherein the radio signal is determined based on whether the parameter of the oscillation signal is greater than or equal to a threshold.

22. The receiver of claim 21, wherein the measurer is further configured to measure an oscillation time as the parameter of the oscillation signal or detect an envelope of the oscillation signal as the parameter of the oscillation signal, and
the radio signal is received based on the oscillation time of the oscillation signal or the envelope of the oscillation signal.

23. The receiver of claim 21, further comprising a fast startup circuit configured to reduce a startup time of the oscillator during a first portion of the pulse by either one or both of:
increasing a current supplied to the oscillator during the first portion of the pulse, and
adjusting a value of a capacitor applied to the oscillator during the first portion of the pulse.

24. The receiver of claim 21, wherein the oscillator is a first oscillator configured to generate a first clock signal having a first frequency and requiring a first power level to operate,
the receiver further comprises:
a second oscillator configured to generate a second clock signal having a second frequency lower than the first frequency and requiring a second power level lower than the first power level to operate, and
a selector configured to select one of the first clock signal and the second clock signal based on the radio signal, and
the pulse generator is further configured to generate the pulse at the interval of the predetermined period based on the selected one of the first clock signal and the second clock signal.

25. The receiver of claim 24, wherein the selector is further configured to:
select the first clock signal in response to the first frequency being at least twice a frequency of the radio signal and the second frequency being less than twice the frequency of the radio signal, and
select the second clock signal in response to both the first frequency and the second frequency being at least twice the frequency of the radio signal.

\* \* \* \* \*